United States Patent
Tanaka et al.

(10) Patent No.: US 12,163,241 B2
(45) Date of Patent: Dec. 10, 2024

(54) MEMBRANE-ELECTRODE-GASKET ASSEMBLY FOR ALKALINE WATER ELECTROLYSIS

(71) Applicant: TOKUYAMA CORPORATION, Shunan (JP)

(72) Inventors: Yasuyuki Tanaka, Shunan (JP); Harumi Sueoka, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 0 days.

(21) Appl. No.: 17/987,217

(22) Filed: Nov. 15, 2022

(65) Prior Publication Data

US 2023/0143558 A1 May 11, 2023

Related U.S. Application Data

(62) Division of application No. 16/767,532, filed as application No. PCT/JP2018/044311 on Nov. 30, 2018, now abandoned.

(30) Foreign Application Priority Data

Dec. 5, 2017 (JP) .................................. 2017-233704

(51) Int. Cl.
*C25B 9/23* (2021.01)
*C25B 1/04* (2021.01)
(Continued)

(52) U.S. Cl.
CPC .................. *C25B 9/23* (2021.01); *C25B 1/04* (2013.01); *C25B 9/73* (2021.01); *C25B 11/03* (2013.01)

(58) Field of Classification Search
CPC .... C25B 9/19; C25B 9/23; C25B 9/63; C25B 9/77
See application file for complete search history.

(56) References Cited

U.S. PATENT DOCUMENTS

| 4,469,577 A | 9/1984 | Schmitt et al. |
| 4,851,099 A | 7/1989 | Brereton |

(Continued)

FOREIGN PATENT DOCUMENTS

| JP | 2002-332586 A | 11/2002 |
| JP | 4453973 B2 | 4/2010 |

(Continued)

OTHER PUBLICATIONS

Final Office Action for U.S. Appl. No. 16/767,532 issued on Aug. 16, 2022.

(Continued)

*Primary Examiner* — Ciel P Contreras
(74) *Attorney, Agent, or Firm* — Birch, Stewart, Kolasch & Birch, LLP

(57) ABSTRACT

A membrane-electrode-gasket assembly for alkaline water electrolysis, the assembly including: a separating membrane having first and second membrane faces; a first electrode arranged in contact with the first membrane face; and an insulating gasket holding the membrane and the electrode as one body, the gasket including: first and second faces for contacting with anode- and cathode-side frames respectively; a slit part opening toward an inner side of the gasket and receiving the entire peripheries of the membrane and the electrode; first and second parts facing with each other across the slit part; and a continuous part arranged on an outer periphery side of the slit part, uniting the first and second parts into one body, and sealing an outer periphery end of the slit part, wherein the first and second parts sandwich therebetween to hold the entire peripheries of the membrane and the electrode received in the slit part into one body.

12 Claims, 14 Drawing Sheets

(51) Int. Cl.
  *C25B 9/73*   (2021.01)
  *C25B 11/03*  (2021.01)

(56) References Cited

U.S. PATENT DOCUMENTS

| | | |
|---|---|---|
| 6,027,620 A | 2/2000 | Jackson et al. |
| 6,254,741 B1 | 7/2001 | Stuart et al. |
| 2005/0095490 A1 | 5/2005 | Mittelstadt et al. |
| 2006/0042935 A1 | 3/2006 | Houda et al. |
| 2011/0014541 A1 | 1/2011 | Yui et al. |
| 2013/0140171 A1 | 6/2013 | Hinatsu et al. |
| 2014/0305794 A1 | 10/2014 | Wallevik et al. |
| 2015/0203976 A1 | 7/2015 | Noaki et al. |
| 2016/0153100 A1 | 6/2016 | Nakagawa et al. |

FOREIGN PATENT DOCUMENTS

| | | |
|---|---|---|
| JP | 2015-117417 A | 6/2015 |
| JP | 6093351 B2 | 3/2017 |
| WO | WO2013/191140 A1 | 12/2013 |
| WO | WO2014/178317 A1 | 11/2014 |

OTHER PUBLICATIONS

International Search Report for PCT/JP2018/044311 (PCT/ISA/210) mailed on Feb. 12, 2019.
Non-Final Office Action for U.S. Appl. No. 16/767,532 issued on Apr. 26, 2022.
Written Opinion of the International Searching Authority for PCT/JP2018/044311 (PCT/ISA/237) mailed on Feb. 12, 2019.

Fig. 2(A) Fig. 2(B) Fig. 2(C)
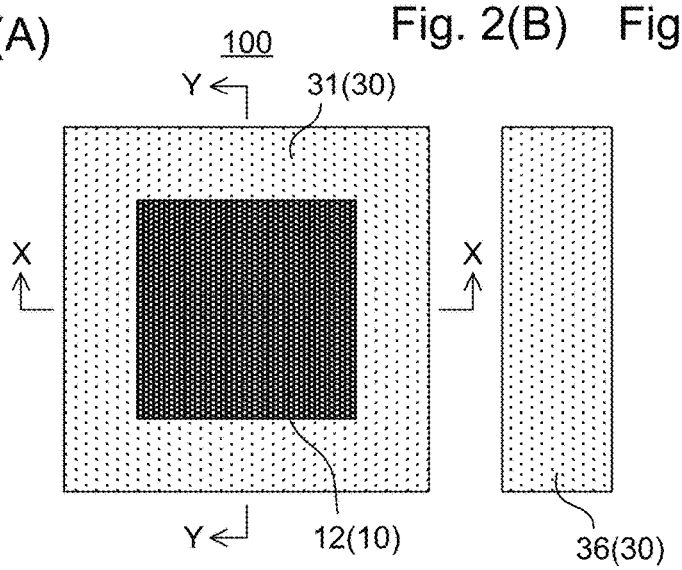 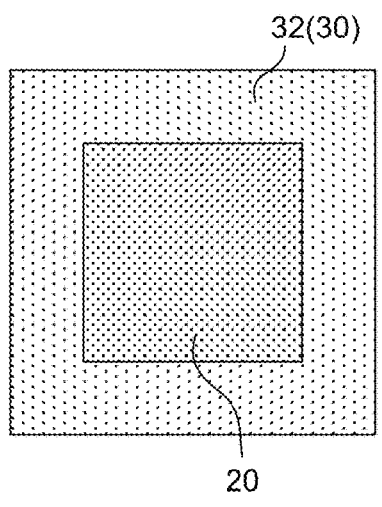
Fig. 2(D)
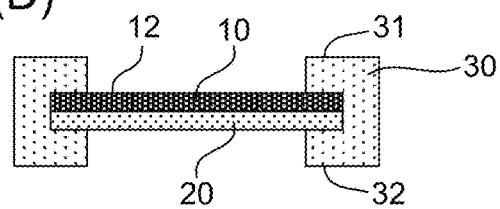
Fig. 2(E)
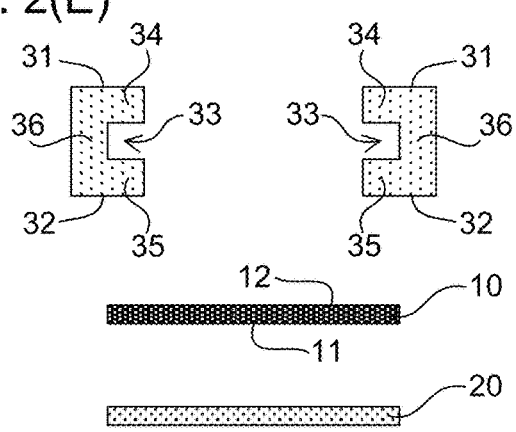

Fig. 3(A) Fig. 3(B) Fig. 3(C)
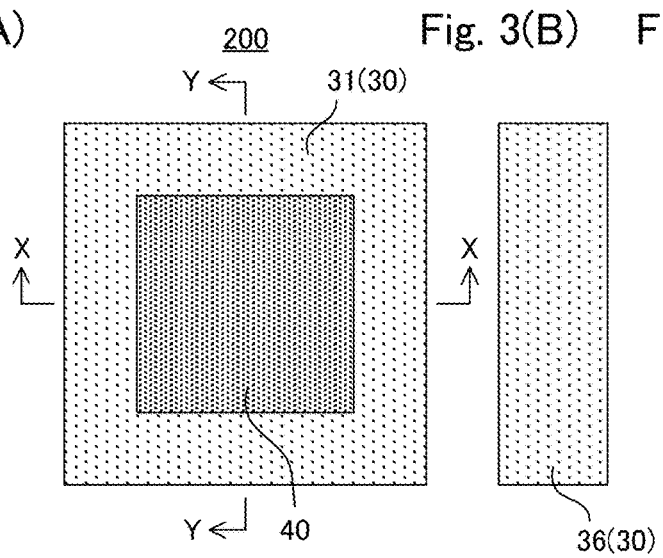
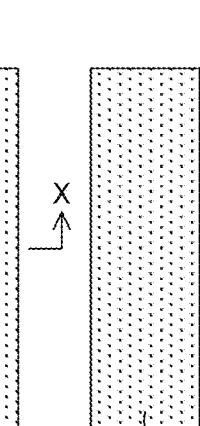
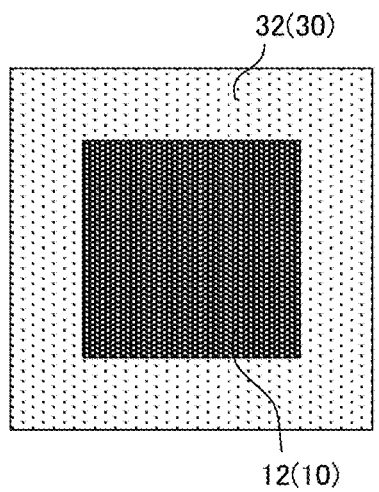
Fig. 3(D)
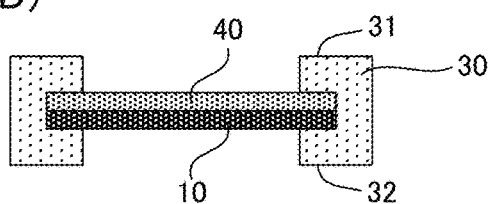
Fig. 3(E)
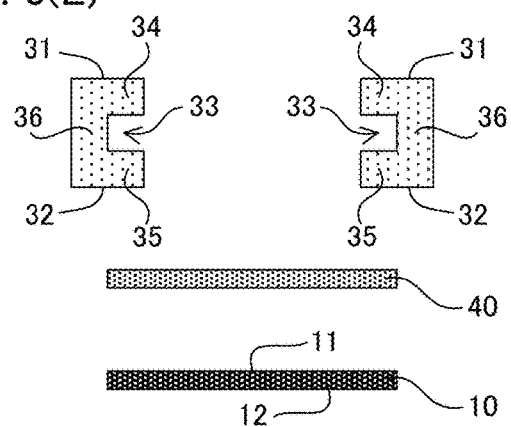

Fig. 4(A)　　　　　Fig. 4(B)　Fig. 4(C)
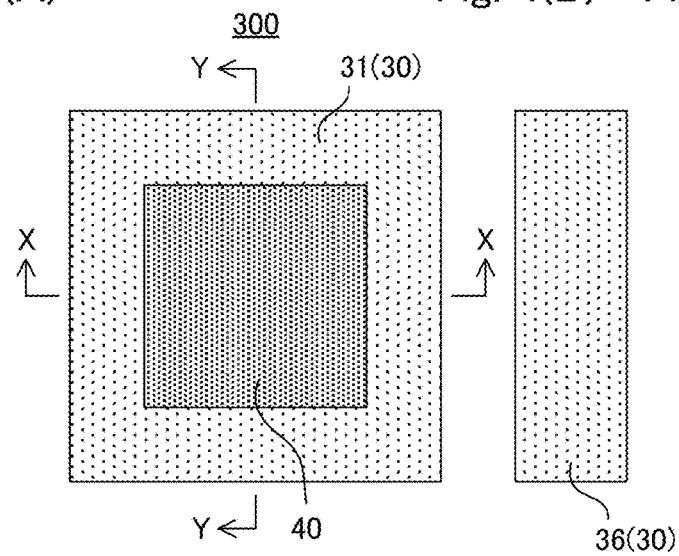
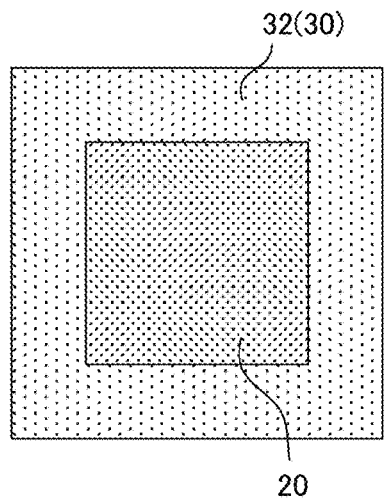
Fig. 4(D)
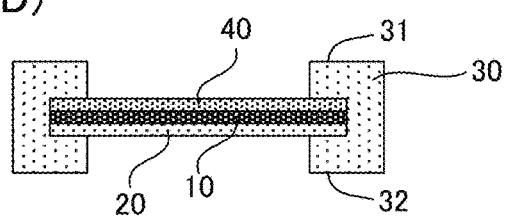
Fig. 4(E)
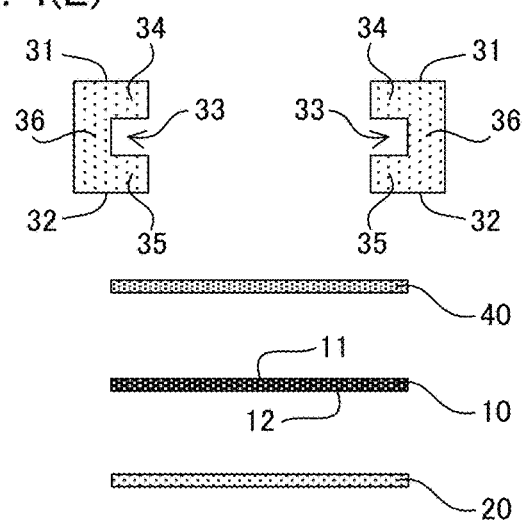

MEMBRANE-ELECTRODE-GASKET ASSEMBLY FOR ALKALINE WATER ELECTROLYSIS

This application is a Divisional of copending application Ser. No. 16/767,532 filed on May 27, 2020, which is the U.S. National Phase of PCT/JP2018/044311, filed on Nov. 30, 2018, and which claims priority under 35 U.S.C. § 119(a) to Application No. JP 2017-233704, filed in Japan on Dec. 5, 2017, the entire contents of all of which are expressly incorporated by reference into the present application.

TECHNICAL FIELD

The present invention relates to a gasket used for electrolysis vessels for alkaline water electrolysis, and more specifically to a membrane-electrode-gasket assembly for alkaline water electrolysis, and an electrolysis vessel for alkaline water electrolysis which includes the same.

BACKGROUND ART

The alkaline water electrolysis method is known as a method of producing hydrogen gas and oxygen gas. In the alkaline water electrolysis method, water is electrolyzed using a basic solution (alkaline water) in which an alkali metal hydroxide (such as NaOH and KOH) dissolves as an electrolytic solution, to generate hydrogen gas at a cathode and oxygen gas at an anode. As an electrolysis vessel for alkaline water electrolysis, an electrolysis vessel including an anode chamber where an anode is arranged and a cathode chamber where a cathode is arranged is known: the electrolysis vessel is partitioned into the anode chamber and the cathode chamber by an ionic-permeable separating membrane. Further proposed for reducing energy loss is an electrolysis vessel having a zero-gap configuration (zero-gap electrolysis vessel) which holds an anode and a cathode so that each of them is directly in contact with a separating membrane.

CITATION LIST

Patent Literature

Patent Literature 1: WO 2013/191140
Patent Literature 2: JP 2002-332586 A
Patent Literature 3: JP 4453973 B
Patent Literature 4 WO 2014/178317
Patent Literature 5 JP 6093351 B
Patent Literature 6: JP 2015-117417 A

SUMMARY OF INVENTION

Technical Problem

FIG. 1 is a schematically explanatory partial cross-sectional view of a conventional zero-gap electrolysis vessel 900 according to one embodiment. The zero-gap electrolysis vessel 900 includes electrode chamber units 910, 910, . . . each including an electroconductive separating wall 911 that separates an anode chamber A and a cathode chamber C, and a flange part 912; an ionic-permeable separating membrane 920 arranged between adjacent electrode chamber units 910, 910; gaskets 930, 930 each arranged between the separating membrane 920 and the flange parts 912 of the electrode chamber units 910, between which the periphery of the separating membrane 920 is sandwiched; an anode 940 held by electroconductive ribs 913, 913, . . . that are provided to stand at the separating wall 911 of one electrode chamber unit; and a flexible cathode 970 held by a current collector 950 that is held by electroconductive ribs 914, 914, . . . that are provided to stand at the separating wall 911 of the other electrode chamber unit, and an electroconductive elastic body 960 that is arranged in contact with the current collector 950. The periphery of the cathode 970 and the periphery of the electroconductive elastic body 960 are fixed to the periphery of the current collector 950. In the zero-gap electrolysis vessel 900, the electroconductive elastic body 960 pushes the flexible cathode 970 toward the separating membrane 920 and the anode 940, which makes the separating membrane 920 sandwiched between adjacent cathode 970 and anode 940. As a result, the separating membrane 920 is in direct contact with the anode 940 and the cathode 970 (that is, zero-gap), which reduces the solution resistance between the anode 940 and the cathode 970, and thus reduces energy loss.

As shown in FIG. 1, however, the separating membrane 920 is not in direct contact with the anode 940 and the cathode 970 (that is, non zero-gap) along the periphery thereof, that is, in the vicinity of the flange part 912 (or the gasket 930), which leads to a large solution resistance between the electrodes along this portion, and as a result leads to an increased operating voltage.

An object of the present invention is to provide a membrane-electrode-gasket assembly for alkaline water electrolysis which makes it possible for a separating membrane to be in direct contact with electrodes even along its periphery. The present invention also provides an electrolysis vessel for alkaline water electrolysis which includes the membrane-electrode-gasket assembly.

Solution to Problem

The present invention encompasses the following embodiments [1] to [14]:

[1] A membrane-electrode-gasket assembly for alkaline water electrolysis, the assembly comprising:
  a separating membrane having a first membrane face and a second membrane face;
  a first electrode arranged in contact with the first membrane face; and
  an insulating gasket holding the separating membrane and the first electrode as one body;
  the gasket comprising:
    a first face for contacting with an anode-side frame;
    a second face for contacting with a cathode-side frame;
    a slit part opening toward an inner peripheral side of the gasket and receiving an entire periphery of the separating membrane and an entire periphery of the first electrode;
    a first part and a second part, the first part and the second part facing each other across the slit part in a direction crossing the first face and the second face, the first part having the first face and the second part having the second face; and
    a continuous part arranged on an outer peripheral side of the slit part, the continuous part uniting the first part and the second part into one body and sealing an outer peripheral end of the slit part,
  wherein the first part and the second part sandwich therebetween the entire periphery of the separating membrane and the entire periphery of the first electrode, to hold the entire periphery of the separating membrane and the entire periphery of the first electrode as one body.

[2] The membrane-electrode-gasket assembly according to [1],
wherein the first electrode is a flexible first porous plate.

[3] The membrane-electrode-gasket assembly according to [1] or [2], further comprising:
a second electrode arranged in contact with the second membrane face of the separating membrane,
wherein the gasket holds the separating membrane, the first electrode, and the second electrode as one body;
the slit part receives the entire periphery of the separating membrane, the entire periphery of the first electrode, and the entire periphery of the second electrode; and
the first part and the second part sandwich therebetween the entire periphery of the separating membrane, the entire periphery of the first electrode, and the entire periphery of the second electrode, to hold the entire periphery of the separating membrane, the entire periphery of the first electrode, and the entire periphery of the second electrode as one body.

[4] The membrane-electrode-gasket assembly according to [3],
wherein the second electrode is a rigid porous plate.

[5] The membrane-electrode-gasket assembly according to [3],
wherein the second electrode is a flexible second porous plate.

[6] An electrolysis vessel for alkaline water electrolysis, the electrolysis vessel comprising:
an anode-side frame defining an anode chamber;
a cathode-side frame defining a cathode chamber;
the membrane-electrode-gasket assembly as in [1] or [2], wherein the anode-side frame and the cathode-side frame sandwich therebetween the assembly, to hold the assembly;
a second electrode arranged in contact with the second membrane face of the separating membrane, wherein the second electrode is not held by the gasket,
wherein the assembly is arranged such that the first membrane face of the separating membrane faces the anode chamber and the second membrane face of the separating membrane faces the cathode chamber;
the first electrode is an anode; and
the second electrode is a cathode.

[7] An electrolysis vessel for alkaline water electrolysis, the electrolysis vessel comprising:
an anode-side frame defining an anode chamber;
a cathode-side frame defining a cathode chamber;
the membrane-electrode-gasket assembly as in [1] or [2], wherein the anode-side frame and the cathode-side frame sandwich therebetween the assembly, to hold the assembly;
a second electrode arranged in contact with the second membrane face of the separating membrane, wherein the second electrode is not held by the gasket,
wherein the assembly is arranged such that the first membrane face of the separating membrane faces the cathode chamber and the second membrane face of the separating membrane faces the anode chamber;
the first electrode is a cathode; and
the second electrode is an anode.

[8] An electrolysis vessel for alkaline water electrolysis, the electrolysis vessel comprising:
an anode-side frame defining an anode chamber;
a cathode-side frame defining a cathode chamber;
the membrane-electrode-gasket assembly as in any one of [3] to [5], wherein the anode-side frame and the cathode-side frame sandwich therebetween the assembly, to hold the assembly,
wherein the assembly is arranged such that the first membrane face of the separating membrane faces the anode chamber and the second membrane face of the separating membrane faces the cathode chamber;
the first electrode is an anode; and
the second electrode is a cathode.

[9] An electrolysis vessel for alkaline water electrolysis, the electrolysis vessel comprising:
an anode-side frame defining an anode chamber;
a cathode-side frame defining a cathode chamber;
the membrane-electrode-gasket assembly as in any one of [3] to [5], wherein the anode-side frame and the cathode-side frame sandwich therebetween the assembly, to hold the assembly,
wherein the assembly is arranged such that the first membrane face of the separating membrane faces the cathode chamber and the second membrane face of the separating membrane faces the anode chamber;
the first electrode is a cathode; and
the second electrode is an anode.

[10] The electrolysis vessel according to any one of [6] to [9], further comprising:
an electroconductive first elastic body pushing the first electrode toward the second electrode,
wherein the first electrode is a flexible first porous plate.

[11] The electrolysis vessel according to [10],
wherein the second electrode is a rigid porous plate.

[12] The electrolysis vessel according to [11], further comprising:
an electroconductive second elastic body pushing the second electrode toward the first electrode.

[13] The electrolysis vessel according to [10], further comprising:
an electroconductive second elastic body pushing the second electrode toward the first electrode,
wherein the second electrode is a flexible second porous plate.

[14] The electrolysis vessel according to [10], further comprising:
an electroconductive rigid current collector arranged in contact with the second electrode,
wherein the rigid current collector is arranged such that the rigid current collector and the separating membrane sandwich therebetween the second electrode;
the second electrode is a flexible second porous plate; and
the second electrode is supported by the rigid current collector.

Advantageous Effects of Invention

The membrane-electrode-gasket assembly for alkaline water electrolysis of the present invention makes it possible for a separating membrane to be in direct contact with (an) electrode(s) even along its periphery. Thus, an electrolysis vessel for alkaline water electrolysis which includes the membrane-electrode-gasket assembly for alkaline water electrolysis of the present invention can further reduce an operating voltage, which makes it possible to further reduce energy loss.

BRIEF DESCRIPTION OF DRAWINGS

FIGS. 2(A), 2(B), 2(C), 2(D) and 2(E) are schematically explanatory views of a membrane-electrode-gasket assembly for alkaline water electrolysis 100 according to one embodiment of the present invention: FIG. 2(A) is a front view; FIG. 2(B) is a right side view; FIG. 2(C) is a rear view; FIG. 2(D) is a cross-sectional view taken along the line X-X of FIG. 2(A); and FIG. 2(E) is an exploded view of FIG. 2(D).

FIGS. 3(A), 3(B), 3(C), 3(D) and 3(E) are schematically explanatory views of a membrane-electrode-gasket assembly for alkaline water electrolysis 200 according to another embodiment of the present invention: FIG. 3(A) is a front view; FIG. 3(B) is a right side view; FIG. 3(C) is a rear view; FIG. 3(D) is a cross-sectional view taken along the line X-X of FIG. 3(A); and FIG. 3(E) is an exploded view of FIG. 3(D).

FIGS. 4(A), 4(B), 4(C), 4(D) and 4(E) are schematically explanatory views of a membrane-electrode-gasket assembly for alkaline water electrolysis 300 according to another embodiment of the present invention: FIG. 4(A) is a front view; FIG. 4(B) is a right side view; FIG. 4(C) is a rear view; FIG. 4(D) is a cross-sectional view taken along the line X-X of FIG. 4(A); and FIG. 4(E) is an exploded view of FIG. 4(D).

DESCRIPTION OF EMBODIMENTS

Figure 1:
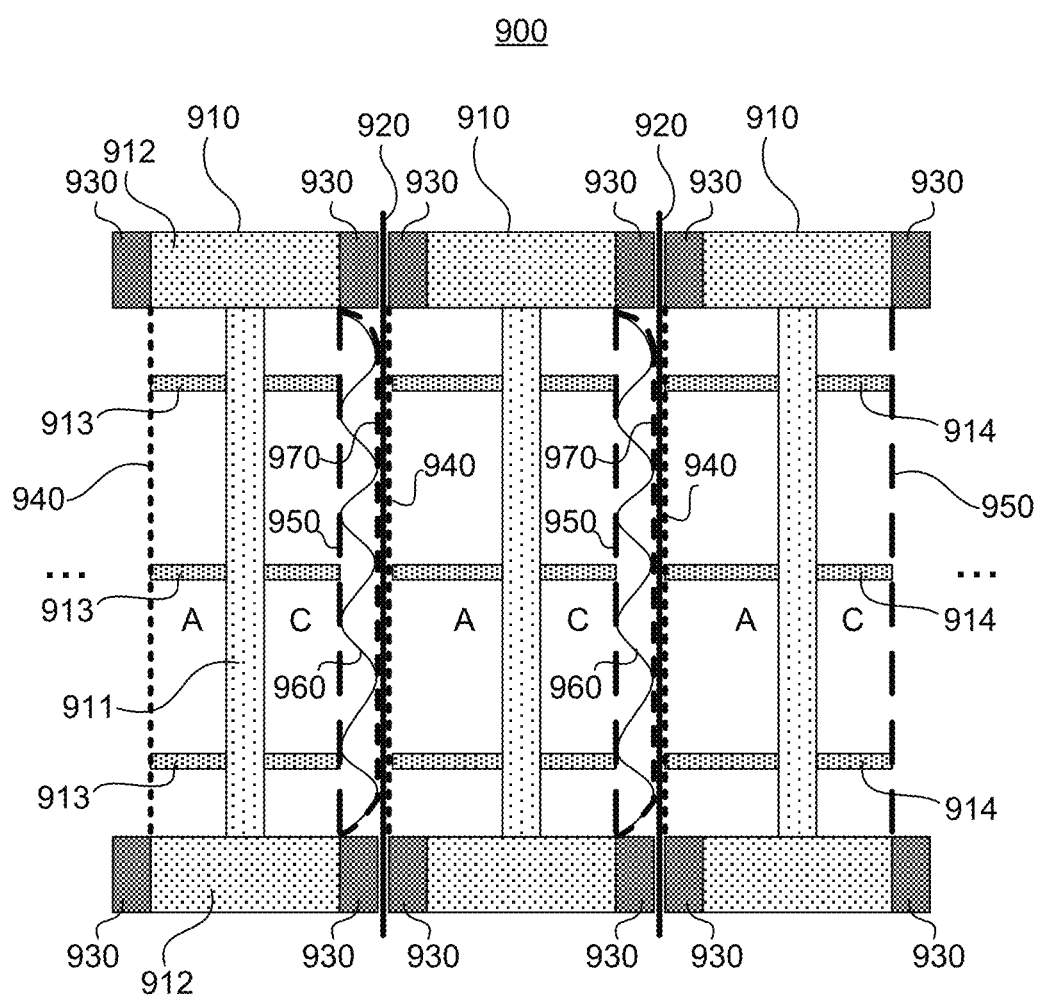
FIG. 1 is a schematically explanatory cross-sectional view of the conventional zero-gap electrolysis vessel 900 according to one embodiment.

The above described operations and advantages of the present invention will be made clear from the following description of the embodiments. Hereinafter the embodiments of the present invention will be described with reference to the drawings. The present invention is not limited to these embodiments. The measures in the drawings do not always represent exact measures. Some reference signs may be omitted in the drawings. In the present description, expression "A to B" concerning numeral values A and B means "no less than A and no more than B" unless otherwise specified. In such expression, if a unit is added only to the numeral value B, this unit is applied to the numeral value A as well. A word "or" means a logical sum unless otherwise specified. Expression "$E_1$ and/or $E_2$" concerning elements $E_1$ and $E_2$ means "$E_1$, or $E_2$, or the combination thereof", and expression "$E_1, \ldots, E_{N-1}$, and/or $E_N$" concerning elements $E_1, \ldots, E_N$ (N is an integer of 3 or more) means "$E_1, \ldots, E_{N-1}$, or $E_N$, or any combination thereof".

<1. Membrane-Electrode-Gasket Assembly for Alkaline Water Electrolysis>

FIGS. 2(A), 2(B), 2(C), 2(D) and 2(E) are schematically explanatory views of the membrane-electrode-gasket assembly for alkaline water electrolysis 100 according to one embodiment of the present invention (hereinafter may be referred to as "assembly 100"). FIGS. 2(A) to 2(C) are respectively a front view, a right side view, and a rear view of the assembly 100, FIG. 2(D) is a cross-sectional view taken along the line X-X of FIG. 2(A), and FIG. 2(E) is an exploded view of FIG. 2(D). The assembly 100 includes a separating membrane 10 having a first membrane face 11 and a second membrane face 12; a cathode (first electrode) 20 arranged in contact with the first membrane face 11; and an insulating gasket 30 holding the separating membrane 10 and the cathode (first electrode) 20 as one body. The gasket 30 includes a first face 31 for contacting with an anode-side frame; a second face 32 for contacting with a cathode-side frame; a slit part 33 opening toward an inner peripheral side of the gasket 30 and receiving the entire periphery of the separating membrane 10 and the entire periphery of the cathode (first electrode) 20; a first part 34 and a second part 35, the first part 34 and the second part 35 facing each other across the slit part 33 in a direction crossing the first face 31 and the second face 32 (vertical direction of FIGS. 2(D) and 2(E) on the sheet), the first part 34 having the first face 31 and the second part 35 having the second face 32; and a continuous part 36 arranged on an outer peripheral side of the slit part 33, the continuous part 36 uniting the first part 34 and the second part 35 into one body and sealing an outer peripheral end of the slit part 33. In the assembly 100, the first part 34 and the second part 35 sandwich therebetween the entire periphery of the separating membrane 10 and the entire periphery of the cathode (first electrode) 20, to hold the entire periphery of the separating membrane 10 and the entire periphery of the cathode (first electrode) 20 as one body. As shown in FIGS. 2(A), 2(C) and 2(D), the cathode (first electrode) 20 is arranged on the same side as the second face 32 of the gasket 30 with respect to the separating membrane 10. A cross-sectional view taken along the line Y-Y of FIG. 2(A) is the same as the cross-sectional view taken along the line X-X of FIG. 2(A), that is, FIG. 2(D).

As the separating membrane 10, any known ionic-permeable separating membrane used for zero-gap electrolysis vessels for alkaline water electrolysis may be used without particular limitations. The separating membrane 10 desirably has low gas permeability, low electric conductivity, and high strength. Examples of the separating membrane 10 include porous separating membranes such as porous membranes formed of asbestos and/or modified asbestos, porous separating membranes using a polysulfone-based polymer, cloths using a polyphenylene sulfide fiber, fluorinated porous membranes, and porous membranes using a hybrid material that includes both inorganic and organic materials. Other than these porous separating membranes, an ion-exchange membrane such as a fluorinated ion-exchange membrane may be used as the separating membrane 10.

As the cathode (first electrode) 20, any known cathode for generating hydrogen which is used for zero-gap electrolysis vessels for alkaline water electrolysis may be used without particular limitations. The cathode 20 usually includes an electroconductive base material, and a catalyst layer covering the surface of the base material. As the electroconductive base material of the cathode 20, for example, nickel, a nickel alloy, stainless steel, mild steel, a nickeled nickel alloy, nickeled stainless steel, or nickeled mild steel may be preferably employed. As the catalyst layer of the cathode 20, a noble metal oxide, nickel, cobalt, molybdenum, or manganese, or a coating formed of an oxide or a noble metal oxide thereof may be preferably employed. The cathode 20 may be, for example, a flexible porous plate, and may be, for example, a rigid porous plate. As the cathode 20 of a rigid porous plate, a porous plate including a rigid electroconductive base material (such as an expanded metal) and the above described catalyst layer may be used. As the cathode 20 of a flexible porous plate, a porous plate including a flexible electroconductive base material (such as a gauze woven (or knitted) out of metal wire, and a thin punching metal) and the above described catalyst layer may be used. The area of one hole of the cathode 20 of a flexible porous plate is preferably 0.05 to 2.0 $mm^2$, and more preferably 0.1 to 0.5 $mm^2$. The ratio of the area of holes of the cathode 20 of a flexible porous plate to the area of a current-carrying cross section is preferably no less than 20%, and more preferably 20 to 50%. The bending flexibility of the cathode 20 of a flexible porous plate is preferably no less than 0.05 mm/g, and more preferably 0.1 to 0.8 mm/g. Bending flexibility in the present description is represented by a value obtained in such a way that: one side of a square sample of 10 mm in length×10 mm in width is fixed so that the sample is horizontal, and a deflection (mm) of another side (end of the sample) when a given load is downwardly applied to the other side, which is opposite to the fixed side, is divided by the load (g). That is, the bending flexibility is a parameter showing an inverse characteristics to bending rigidity. The bending flexibility may be adjusted by a material and thickness of a porous plate, and in the case of gauze, by a way of weaving (or knitting) metal wire constituting the gauze etc.

The gasket 30 has, as shown in FIGS. 2(A) and 2(C), a shape corresponding to the shapes of the anode-side frame and the cathode-side frame. As shown in FIGS. 2(B), 2(D), and 2(E), the first face 31 and the second face 32 of the gasket 30 are flat faces. The gasket 30 is preferably formed of an alkali-resistant elastomer. Examples of the material of the gasket 30 include elastomers such as natural rubber (NR), styrene-butadiene rubber (SBR), polychloroprene (CR), butadiene rubber (BR), acrylonitrile-butadiene rubber (NBR), silicone rubber (SR), ethylene propylene rubber (EPT), ethylene propylene diene monomer rubber (EPDM), fluoro rubber (FR), isobtylene isoprene rubber (IIR), urethane rubber (UR), and chlorosulfonated polyethylene rubber (CSM). When a gasket material that does not have alkali resistance is used, a layer of an alkali-resistant material may be provided for the surface of the gasket material by coating or the like.

The method of producing the assembly 100 is not particularly limited. For example, the peripheries of the separating membrane 10 and the cathode 20 are sandwiched between a gasket member on the anode side which includes the first face 31, and a gasket member on the cathode side which includes the second face 32, and thereafter the periphery of the gasket member on the anode side and the periphery of the gasket member on the cathode side are united into one body by welding, adhering, or the like, which makes it possible to obtain the assembly 100 where the slit part 33 of the gasket 30 that includes the slit part 33 and the continuous part 36 holds the peripheries of the separating membrane 10 and the cathode 20 (see FIGS. 2(D) and 2(E)). For example, one may separately prepare the separating membrane 10, the cathode 20, and the gasket 30, and thereafter may insert the peripheries of the separating membrane 10 and the cathode 20 into the slit part 33 of the gasket 30 as temporarily changing the shape of the gasket 30.

In the membrane-electrode-gasket assembly for alkaline water electrolysis 100, the entire periphery of the separating membrane 10 and the entire periphery of the cathode 20, which are received in the slit part 33 of the gasket 30, are sandwiched between and held by the first part 34 and the second part 35 of the gasket 30 as one body, which makes it possible for at least the separating membrane 10 and the cathode 20 to be in direct contact with each other all over the faces thereof (that is, even the periphery). Thus, employing the assembly 100 for a zero-gap electrolysis vessel for alkaline water electrolysis offers further reduced operating voltage and energy loss. In conventional zero-gap electrolysis vessels, each electrode is fixed to an electrolysis element (anode-side frame or cathode-side frame), and measures such as welding and pinning are necessary for fixing electrodes. In contrast, according to the assembly 100, since the cathode 20 is united with the separating membrane 10 and the gasket 30 into one body, there is no need to fix the cathode 20 to the cathode-side frame. Therefore, employing the assembly 100 for a zero-gap electrolysis vessel for alkaline water electrolysis offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

In the foregoing description concerning the present invention, the assembly 100 of the embodiment of including the separating membrane 10, the cathode 20, and the gasket 30 has been described as an example. The present invention is not limited to this embodiment. For example, an embodiment of a membrane-electrode-gasket assembly for alkaline water electrolysis may comprise an anode instead of the cathode 20.

FIGS. 3(A), 3(B), 3(C), 3(D) and 3(E) are schematically explanatory views of a membrane-electrode-gasket assembly for alkaline water electrolysis 200 according to such another embodiment (hereinafter may be referred to as "assembly 200"). FIGS. 3(A) to 3(C) are respectively a front view, a right side view, and a rear view of the assembly 200, FIG. 3(D) is a cross-sectional view taken along the line X-X of FIG. 3(A); and FIG. 3(E) is an exploded view of FIG. 3(D). In FIGS. 3(A) to 3(E), elements already shown in FIGS. 2(A) to 2(E) are given the same reference signs as in FIGS. 2(A) to 2(E), and the descriptions thereof may be omitted. The assembly 200 includes the separating membrane 10 having the first membrane face 11 and the second membrane face 12; an anode (first electrode) 40 arranged in contact with the first membrane face 11; and the insulating gasket 30 holding the separating membrane 10 and the anode (first electrode) 40 as one body. The gasket 30 includes the first face 31 for contacting with the anode-side frame; the second face 32 for contacting with the cathode-side frame; the slit part 33 opening toward the inner peripheral side of the gasket 30 and receiving the entire periphery of the separating membrane 10 and the entire periphery of the anode (first electrode) 40; the first part 34 and the second part 35, the first part 34 and the second part 35 facing each other across the slit part 33 in the direction crossing the first face 31 and the second face 32, the first part 34 having the first face 31 and the second part 35 having the second face 32; and the continuous part 36 arranged on the outer peripheral side of the slit part 33, the continuous part 36 uniting the first part 34 and the second part 35 into one body and sealing the outer peripheral end of the slit part 33. In the assembly 200, the first part 34 and the second part 35 sandwich therebetween the entire periphery of the separating membrane 10 and the entire periphery of the anode (first electrode) 40, to hold the entire periphery of the separating membrane 10 and the entire periphery of the anode (first electrode) 40 as one body. As shown in FIGS. 3(A), 3(C) and 3(D), the anode (first electrode) 40 is arranged on the same side as the first face 31 of the gasket 30 with respect to the separating membrane 10. A cross-sectional view taken along the line Y-Y of FIG. 3(A) is the same as the cross-sectional view taken along the line X-X of FIG. 3(A), that is, FIG. 3(D).

The separating membrane 10 and the gasket 30 in the assembly 200 are the same as the separating membrane 10 and the gasket 30 in the assembly 100. As the anode (first electrode) 40, any known anode for generating oxygen which is used for zero-gap electrolysis vessels for alkaline water electrolysis may be used without particular limitations. The anode 40 usually includes an electroconductive base material, and a catalyst layer covering the surface of the base material. The catalyst layer is preferably porous. As the electroconductive base material of the anode 40, for example, ferronickel, vanadium, molybdenum, copper, silver, manganese, platinum group metals, graphite, or chromium, or any combination thereof may be used. In the anode 40, an electroconductive base material formed of nickel may be preferably used. The catalyst layer includes nickel as an element. The catalyst layer preferably includes nickel oxide, metallic nickel or nickel hydroxide, or any combination thereof, and may include an alloy of nickel and at least one other metal. The catalyst layer is especially preferably formed of metallic nickel. The catalyst layer may further include chromium, molybdenum, cobalt, tantalum, zirconium, aluminum, zinc, platinum group metals, or rare earth elements, or any combination thereof. Rhodium, palladium, iridium, or ruthenium, or any combination thereof may be further supported on the surface of the catalyst layer as an additional catalyst. The anode 40 may be, for example, a flexible porous plate, and may be, for example, a rigid porous plate. As the anode 40 of a rigid porous plate, a porous plate including a rigid electroconductive base material (such as an expanded metal) and the above described catalyst layer may be used. As the anode 40 of a flexible porous plate, a porous plate including a flexible electroconductive base material (such as gauze woven (or knitted) out of metal wire, and a thin punching metal) and the above described catalyst layer may be used. The ratio of the area of holes of the anode 40 of a flexible porous plate is preferably 0.05 to 2.0 mm$^2$, and more preferably 0.1 to 0.5 mm$^2$. The ratio of the area of holes of the anode 40 of a flexible porous plate to the area of a current-carrying cross section is preferably no less than 20%, and more preferably 20 to 50%. The bending flexibility of the anode 40 of a flexible porous plate is preferably no less than 0.05 mm/g, and more preferably 0.1 to 0.8 mm/g.

The method of producing the assembly 200 is not particularly limited. For example, the peripheries of the separating membrane 10 and the anode 40 are sandwiched between a gasket member on the anode side which includes the first face 31, and a gasket member on the cathode side which includes the second face 32, and thereafter the periphery of the gasket member on the anode side and the periphery of the gasket member on the cathode side are united into one body by welding, adhering, or the like, which makes it possible to obtain the assembly 200 where the slit part 33 of the gasket 30 that includes the slit part 33 and the continuous part 36 holds the peripheries of the separating membrane 10 and the anode 40 (see FIGS. 3(D) and 3(E)). For example, one may separately prepare the separating membrane 10, the anode 40, and the gasket 30, and thereafter may insert the peripheries of the separating membrane 10 and the anode 40 into the slit part 33 of the gasket 30 as temporarily changing the shape of the gasket 30.

In the membrane-electrode-gasket assembly for alkaline water electrolysis 200, the entire periphery of the separating membrane 10 and the entire periphery of the anode 40, which are received in the slit part 33 of the gasket 30, are sandwiched between and held by the first part 34 and the second part 35 of the gasket 30 as one body, which makes it possible for at least the separating membrane 10 and the anode 40 to be in direct contact with each other all over the faces thereof (that is, even the periphery). Thus, employing the assembly 200 for a zero-gap electrolysis vessel for alkaline water electrolysis offers further reduced operating voltage and energy loss. In conventional zero-gap electrolysis vessels, each electrode is fixed to an electrolysis element (anode-side frame or cathode-side frame), and measures such as welding and pinning are necessary for fixing electrodes. In contrast, according to the assembly 200, since the anode 40 is united with the separating membrane 10 and the gasket 30 into one body, there is no need to fix the anode 40 to the anode-side frame. Therefore, employing the assembly 200 for a zero-gap electrolysis vessel for alkaline water electrolysis offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

In the foregoing description concerning the present invention, the assembly 100 of the embodiment of including the separating membrane 10, the cathode 20 and the gasket 30, and the assembly 200 of the embodiment of including the separating membrane 10, the anode 40 and the gasket 30 have been described as an example. The present invention is not limited to these embodiments. For example, an embodiment of a membrane-electrode-gasket assembly for alkaline water electrolysis may comprise both of a cathode and an anode.

FIGS. 4(A), 4(B), 4(C), 4(D) and 4(E) are schematically explanatory views of a membrane-electrode-gasket assembly for alkaline water electrolysis 300 according to such another embodiment (hereinafter may be referred to as "assembly 300"). FIGS. 4(A) to 4(C) are respectively a front view, a right side view, and a rear view of the assembly 300, FIG. 4(D) is a cross-sectional view taken along the line X-X of FIG. 4(A); and FIG. 4(E) is an exploded view of FIG. 4(D). In FIGS. 4(A) to 4(E), elements already shown in FIGS. 2(A) to 2(E) and 3(A) to 3(E) are given the same reference signs as in FIGS. 2(A) to 2(E) and 3(A) to 3(E), and the description thereof may be omitted. The assembly 300 includes the separating membrane 10 having the first membrane face 11 and the second membrane face 12; the anode (first electrode) 40 arranged in contact with the first membrane face 11; the cathode (second electrode) 20 arranged in contact with the second membrane face 12; and the insulating gasket 30 holding the separating membrane 10, the anode (first electrode) 40, and the cathode (second electrode) 20 as one body. The gasket 30 includes the first face 31 for contacting with the anode-side frame; the second face 32 for contacting with the cathode-side frame; the slit part 33 opening toward the inner peripheral side of the gasket 30 and receiving the entire periphery of the separating membrane 10 and the entire periphery of the anode (first electrode) 40 and the entire periphery of the cathode (second electrode) 20; the first part 34 and the second part 35, the first part 34 and the second part 35 facing each other across the slit part 33 in the direction crossing the first face 31 and the second face 32 (vertical direction of FIGS. 4(D) and 4(E) on the sheet), the first part 34 having the first face 31 and the second part 35 having the second face 32; and the continuous part 36 arranged on the outer peripheral side of the slit part 33, the continuous part 36 uniting the first part 34 and the second part 35 into one body and sealing the outer peripheral end of the slit part 33. In the assembly 300, the first part 34 and the second part 35 sandwich therebetween the entire periphery of the separating membrane 10, the entire periphery of the anode (first electrode) 40, and the entire periphery of the cathode (second electrode) 20, to hold the entire periphery of the separating membrane 10, the entire periphery of the anode (first electrode) 40, and the entire periphery of the cathode (second electrode) 20 as one body. As shown in FIGS. 4(A), 4(C) and 4(D), the anode (first electrode) 40 is arranged on the same side as the first face 31 of the gasket 30 with respect to the separating membrane 10, and the cathode (second electrode) 20 is arranged on the same side as the second face 32 of the gasket 30 with respect to the separating membrane 10. A cross-sectional view taken along the line Y-Y of FIG. 4(A) is the same as the cross-sectional view taken along the line X-X of FIG. 4(A), that is, FIG. 4(D).

The separating membrane 10, the anode 40, the cathode 20, and the gasket 30 in the assembly 300 are respectively the same as the separating membrane 10, the anode 40, the cathode 20, and the gasket 30 in the assemblies 100 and 200.

The method of producing the assembly 300 is not particularly limited. For example, the peripheries of the anode 40, the separating membrane 10, and the cathode 20 are sandwiched between a gasket member on the anode side which includes the first face 31, and a gasket member on the cathode side which includes the second face 32, and thereafter the periphery of the gasket member on the anode side and the periphery of the gasket member on the cathode side are united into one body by welding, adhering, or the like, which makes it possible to obtain the assembly 300 where the slit part 33 of the gasket 30 that includes the slit part 33 and the continuous part 36 holds the peripheries of the anode 40, the separating membrane 10, and the cathode 20 (see FIGS. 4(D) and 4(E)). For example, one may separately prepare the separating membrane 10, the anode 40, the cathode 20, and the gasket 30, and thereafter may insert the peripheries of the separating membrane 10, the anode 40, and the cathode 20 into the slit part 33 of the gasket 30 as temporarily changing the shape of the gasket 30.

In the membrane-electrode-gasket assembly for alkaline water electrolysis 300, the entire periphery of the separating membrane 10, the entire periphery of the anode 40, and the entire periphery of the cathode 20, which are received in the slit part 33 of the gasket 30, are sandwiched between and held by the first part 34 and the second part 35 of the gasket 30 as one body, which makes it possible for the anode 40 and the separating membrane 10 to be in direct contact with each other all over the faces thereof (that is, even the periphery), and for the separating membrane 10 and the cathode 20 to be in direct contact with each other all over the faces thereof (that is, even the periphery). Thus, employing the assembly 300 for a zero-gap electrolysis vessel for alkaline water electrolysis offers further reduced operating voltage and energy loss. In conventional zero-gap electrolysis vessels, each electrode is fixed to an electrolysis element (anode-side frame or cathode-side frame), and measures such as welding and pinning are necessary for fixing electrodes. In contrast, according to the assembly 300, since the anode 40 and the cathode 20 are united with the separating membrane 10 and the gasket 30 into one body, there is no need to fix the anode 40 to the anode-side frame, and there is no need to fix the cathode 20 to the cathode-side frame either. Therefore, employing the assembly 300 for a zero-gap electrolysis vessel for alkaline water electrolysis offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

In the foregoing description concerning the present invention, the assemblies 100, 200, and 300 of the embodiment of including the quadrangular gasket 30 have been described as an example. The present invention is not limited to this embodiment. For example, an embodiment of a membrane-electrode-gasket assembly for alkaline water electrolysis may include a gasket having an annular shape, or a polygonal shape other than a quadrangular shape (such as a hexagonal or octagonal shape). The shapes of the separating membrane, the cathode, and the anode are determined according to the shape of the gasket.

<2. Electrolysis Vessel for Alkaline Water Electrolysis>

Figure 5:
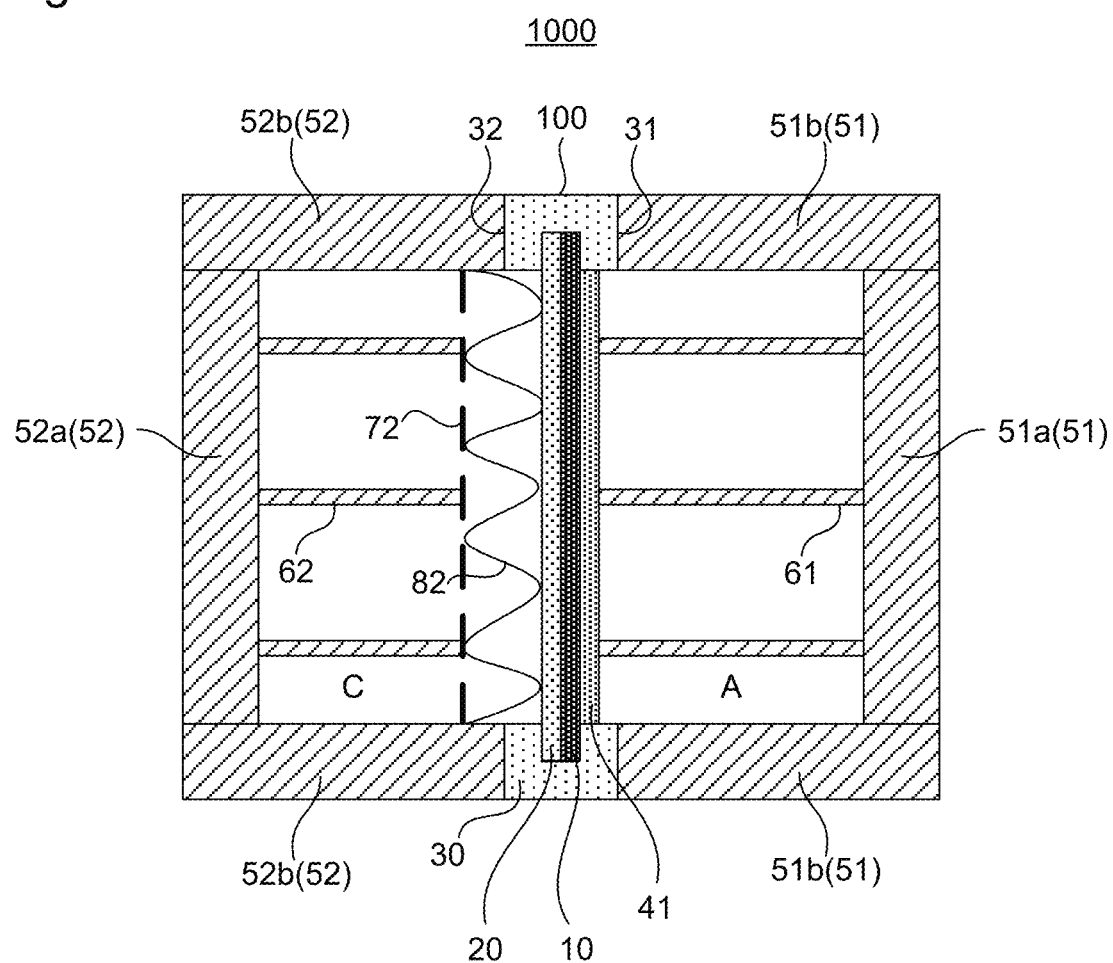
FIG. 5 is a schematically explanatory cross-sectional view of an electrolysis vessel for alkaline water electrolysis 1000 according to one embodiment of the present invention.

FIG. 5 is a schematically explanatory cross-sectional view of an electrolysis vessel for alkaline water electrolysis 1000 according to one embodiment of the present invention (hereinafter may be referred to as "electrolysis vessel 1000"). The electrolysis vessel 1000 is an electrolysis vessel for alkaline water electrolysis which includes the above described membrane-electrode-gasket assembly 100 (see FIGS. 2(A) to 2(E)). As shown in FIG. 5, the electrolysis vessel 1000 includes an electroconductive anode-side frame 51 defining an anode chamber A; an electroconductive cathode-side frame 52 defining a cathode chamber C; the assembly 100 sandwiched between and held by the anode-side frame 51 and the cathode-side frame 52 so that the anode-side frame 51 is in contact with the first face 31 and the cathode-side frame 52 is in contact with the second face 32; and an anode (second electrode) 41 arranged in contact with the second membrane face 12 of the separating membrane 10, wherein the anode 41 is not held by the gasket 30. In the electrolysis vessel 1000, the assembly 100 is arranged so that the first membrane face 11 of the separating membrane 10 faces the cathode chamber C, and the second membrane face 12 of the separating membrane 10 faces the anode chamber A. In the electrolysis vessel 1000, the cathode (first electrode) 20 is a flexible porous plate (first porous plate), and the anode (second electrode) 41 is a rigid porous plate (second porous plate). The electrolysis vessel 1000 further includes electroconductive ribs 61, 61, . . . (hereinafter may be referred to as "electroconductive rib 61") that are provided so as to stick out from the inner wall of the anode-side frame 51. The anode 41 is held by the electroconductive rib 61. The electrolysis vessel 1000 also includes electroconductive ribs 62, 62 . . . (hereinafter may be referred to as "electroconductive rib 62") that are provided so as to stick out from the inner wall of the cathode-side frame 52, a current collector 72 that is held by the electroconductive rib 62, and an electroconductive elastic body (first elastic body) 82 that is held by the current collector 72. The cathode 20 is pushed by the elastic body 82 toward the anode 41.

As the anode-side frame 51 and the cathode-side frame 52, any known frame used for electrolysis vessels for alkaline water electrolysis may be used without particular limitations as long as the anode chamber A and the cathode chamber C can be separately defined. The anode-side frame 51 has an electroconductive backside separating wall 51a, and a flange part 51b uniting with the entire periphery of the backside separating wall 51a so as to have watertightness. Likewise, the cathode-side frame 52 has an electroconductive backside separating wall 52a, and a flange part 52b uniting with the entire periphery of the backside separating wall 52a so as to have watertightness. The backside separating walls 51a and 52a each define adjacent electrolytic cells, and electrically connect the adjacent electrolytic cells in series. The flange part 51b, together with the backside separating wall 51a, the separating membrane 10 and the gasket 30, defines the anode chamber, and the flange part 52b, together with the backside separating wall 52a, the separating membrane 10 and the gasket 30, defines the cathode chamber. The flange parts 51b and 52b have shapes corresponding to the gasket 30 of the assembly 100. That is, when the gasket 30 of the assembly 100 is sandwiched between and held by the anode-side frame 51 and the cathode-side frame 52, the flange part 51b of the anode-side frame 51 is in contact with the first face 31 of the gasket 30 without any gap, and the flange part 52b of the cathode-side frame 52 is in contact with the second face 32 of the gasket 30 without any gap. While not shown in FIG. 5, the flange part 51b includes an anolyte supply flow path to supply an anolyte to the anode chamber A, and an anolyte collection flow path to collect the anolyte and gas generated at the anode from the anode chamber A. The flange part 52b includes a catholyte supply flow path to supply a catholyte to the cathode chamber C, and a catholyte collection flow path to collect the catholyte and gas generated at the cathode from the cathode chamber C. As the material of the backside separating walls 51a and 52a, any alkali-resistant rigid electroconductive material may be used without particular limitations. Examples of such a material include simple metals such as nickel and iron; stainless steel such as SUS304, SUS310, SUS310S, SUS316, and SUS316L; and metal materials obtained by nickeling any of them. As the material of the flange parts 51b, and 52b, any alkali-resistant rigid electroconductive material may be used without particular limitations. Examples of such a material include simple metals such as nickel and iron; stainless steel such as SUS304, SUS310, SUS310S, SUS316, and SUS316L; metal materials obtained by nickeling any of them; and non-metal materials such as reinforced plastics. The backside separating wall 51a and the flange part 51b of the anode-side frame 51 may be united by welding, adhesion, or the like, and may be formed of the same material into one body. Likewise, the backside separating wall 52a and the flange part 52b of the cathode-side frame 52 may be united by welding, adhesion, or the like, and may be formed of the same material into one body. While only a single electrolytic cell (electrolysis vessel 1000) is shown in FIG. 5, the flange part 51b of the anode-side frame 51 may extend to the opposite side of the backside separating wall 51a (right side of the sheet of FIG. 5) as well, to define, together with the backside separating wall 51a, a cathode chamber of a neighboring electrolytic cell, and the flange part 52b of the cathode-side frame 52 may extend to the opposite side of the backside separating wall 52a (left side of the sheet of FIG. 5), to define, together with the backside separating wall 52a, an anode chamber of a neighboring electrolytic cell.

As the electroconductive rib 61 and the electroconductive rib 62, any known electroconductive rib used for electrolysis vessels for alkaline water electrolysis may be used without particular limitations. In the electrolysis vessel 1000, the electroconductive rib 61 is provided to stand at the backside separating wall 51a of the anode-side frame 51, and the electroconductive rib 62 is provided to stand at the backside separating wall 52a of the cathode-side frame. The shape, number, and arrangement of the electroconductive rib 61 are not particularly limited as long as the electroconductive rib 61 can fix the anode 41 to the anode-side frame 51 to hold the anode 41. The shape, number, and arrangement of the electroconductive rib 62 are not particularly limited either as long as the electroconductive rib 62 can fix the current collector 72 to the cathode-side frame 52 to hold the current collector 72. As the material of the electroconductive rib 61 and the electroconductive rib 62, any alkali-resistant rigid electroconductive material may be used without particular limitations. Examples of such a material include materials such as simple metals such as nickel and iron; stainless steel such as SUS304, SUS310, SUS310S, SUS316, and SUS316L; and metals obtained by nickeling any of them.

As the current collector 72, any known current collector used for electrolysis vessels for alkaline water electrolysis may be used without particular limitations. For example, an expanded metal or punching metal made from an alkali-resistant rigid electroconductive material may be preferably employed. Examples of the material of the current collector 72 include simple metals such as nickel and iron; stainless steel such as SUS304, SUS310, SUS310S, SUS316, and SUS316L; and metals obtained by nickeling any of them. When the electroconductive rib 62 holds the current collector 72, any known means such as welding and pinning may be employed without particular limitations.

As the elastic body 82, any known electroconductive elastic body used for electrolysis vessels for alkaline water electrolysis may be used without particular limitations. For example, an elastic mat, a coil spring, a leaf spring, or the like that is made of an aggregate of metal wires of an alkali-resistant electroconductive material may be preferably employed. Examples of the material of the elastic body 82 include simple metals such as nickel and iron; stainless steel such as SUS304, SUS310, SUS310S, SUS316, and SUS316L; and metals obtained by nickeling any of them. When the current collector 72 holds the elastic body 82, any known means such as welding, pinning, and bolting may be employed without particular limitations.

As the anode 41, any anode of a rigid porous plate for alkaline water electrolysis which is the same as the anode 40 described above concerning the assembly 200 (FIGS. 3(A) to 3(E)) may be used without particular limitations. When the rib 61 holds the anode 41, any known means such as welding, pinning, and bolting may be employed without particular limitations.

The electrolysis vessel 1000 includes the membrane-electrode-gasket assembly for alkaline water electrolysis 100, which makes it possible for at least the separating membrane 10 and the cathode 20 to be in direct contact with each other all over the faces thereof (that is, even the periphery). Thus, the electrolysis vessel 1000 offers reduced operating voltage and energy loss more than conventional zero-gap electrolysis vessels. Since the cathode 20 is united with the separating membrane 10 and the gasket 30 into one body, there is no need to fix the cathode 20 to the cathode-side frame 52. Therefore, the electrolysis vessel 1000 offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

Figure 6:
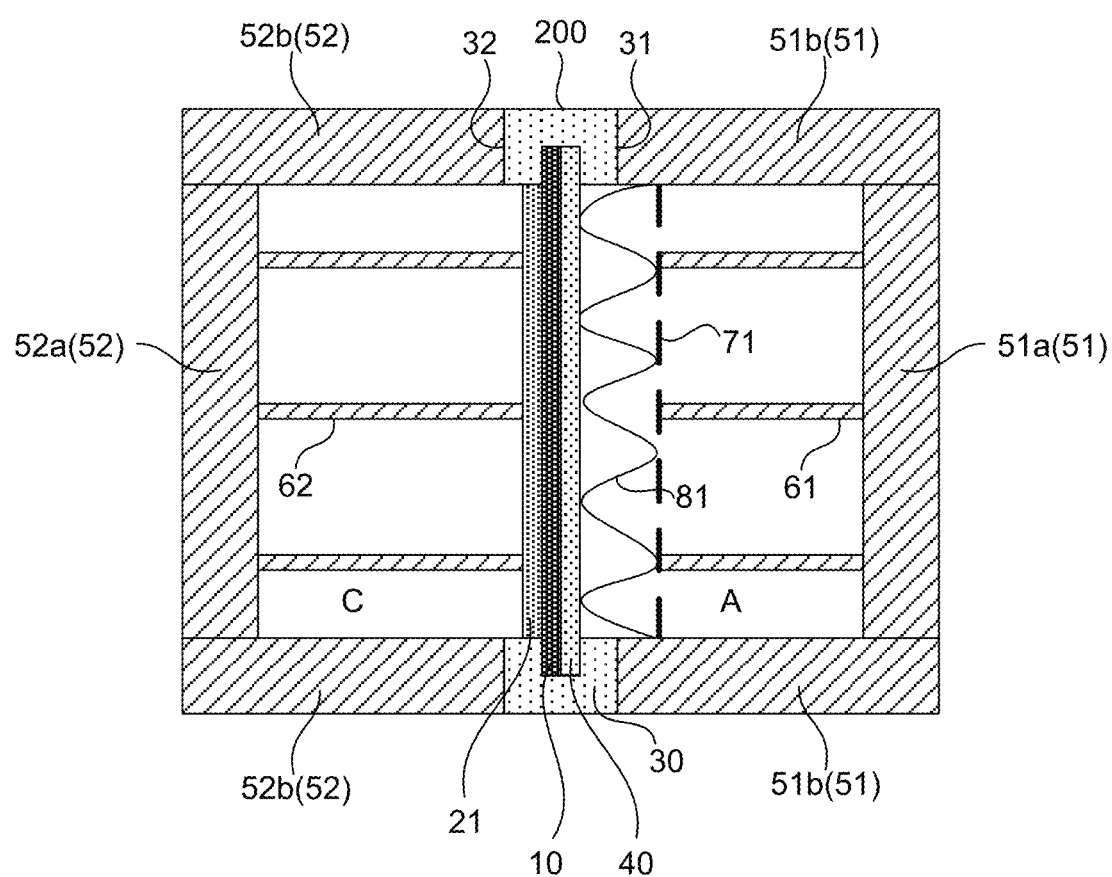
FIG. 6 is a schematically explanatory cross-sectional view of an electrolysis vessel for alkaline water electrolysis 2000 according to another embodiment of the present invention.

In the foregoing description concerning the present invention, the electrolysis vessel for alkaline water electrolysis 1000 of the embodiment of including the assembly 100 has been described as an example. The present invention is not limited to this embodiment. For example, an embodiment of an electrolysis vessel for alkaline water electrolysis may comprise the above descried assembly 200 (FIGS. 3(A) to 3(E)). FIG. 6 is a schematically explanatory cross-sectional view of an electrolysis vessel for alkaline water electrolysis 2000 according to such another embodiment (hereinafter may be referred to as "electrolysis vessel 2000"). In FIG. 6, elements already shown in FIGS. 2(A) to 2(E), 3(A) to 3(E), 4(A) to 4(E) and 5 are given the same reference signs as in FIGS. 2(A) to 2(E), 3(A) to 3(E), 4(A) to 4(E) and 5, and the description thereof may be omitted. As shown in FIG. 6, the electrolysis vessel 2000 includes the electroconductive anode-side frame 51 defining the anode chamber A; the electroconductive cathode-side frame 52 defining the cathode chamber C; the assembly 200 sandwiched between and held by the anode-side frame 51 and the cathode-side frame 52 so that the anode-side frame 51 is in contact with the first face 31 and the cathode-side frame 52 is in contact with the second face 32; and a cathode (second electrode) 21 arranged in contact with the second membrane face 12 of the separating membrane 10, wherein the cathode 21 is not held by the gasket 30. In the electrolysis vessel 2000, the assembly 200 is arranged so that the first membrane face 11 of the separating membrane 10 faces the anode chamber A, and the second membrane face 12 of the separating membrane 10 faces the cathode chamber C. In the electrolysis vessel 2000, the anode (first electrode) 40 is a flexible porous plate (first porous plate), and the cathode (second electrode) 21 is a rigid porous plate (second porous plate). The electrolysis vessel 2000 further includes the electroconductive rib 62 that is provided so as to stick out from the inner wall of the cathode-side frame 52. The cathode 21 is held by the electroconductive rib 62. The electrolysis vessel 2000 also includes the electroconductive rib 61 that is provided so as to stick out from the inner wall of the anode-side frame 51, a current collector 71 that is held by the electroconductive rib 61, and an electroconductive elastic body (first elastic body) 81 that is held by the current collector 71. The anode 40 is pushed by the elastic body 81 toward the cathode 21.

As the current collector 71, any known current collector used for electrolysis vessels for alkaline water electrolysis may be used without particular limitations. For example, an expanded metal, a punching metal, or a net made from an alkali-resistant rigid electroconductive material may be preferably employed. Examples of the material of the current collector 71 include simple metals such as nickel and iron; stainless steel such as SUS304, SUS310, SUS310S, SUS316, and SUS316L; and metals obtained by nickeling any of them. When the electroconductive rib 61 holds the current collector 71, any known means such as welding and pinning may be employed without particular limitations.

As the elastic body 81, any known electroconductive elastic body used for electrolysis vessels for alkaline water electrolysis may be used without particular limitations. For example, an elastic mat, a coil spring, a leaf spring, or the like that is made of an aggregate of metal wires of an alkali-resistant electroconductive material may be preferably employed. Examples of the material of the elastic body 81 include simple metals such as nickel and iron; stainless steel such as SUS304, SUS310, SUS310S, SUS316, and SUS316L; and metals obtained by nickeling any of them. When the current collector 71 holds the elastic body 81, any known means such as welding and pinning may be employed without particular limitations.

As the cathode 21, any cathode of a rigid porous plate for alkaline water electrolysis which is the same as the cathode 20 described above concerning the assembly 100 (FIGS. 2(A)-2(E)) may be used without particular limitations. When the rib 62 holds the cathode 21, any known means such as welding, pinning, and bolting may be employed without particular limitations.

The electrolysis vessel 2000 includes the membrane-electrode-gasket assembly for alkaline water electrolysis 200, which makes it possible for at least the separating membrane 10 and the anode 40 to be in direct contact with each other all over the faces thereof (that is, even the periphery). Thus, the electrolysis vessel 2000 offers reduced operating voltage and energy loss more than conventional zero-gap electrolysis vessels. Since the anode 40 is united with the separating membrane 10 and the gasket 30 into one body, there is no need to fix the anode 40 to the anode-side frame 51. Therefore, the electrolysis vessel 2000 offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

Figure 7:
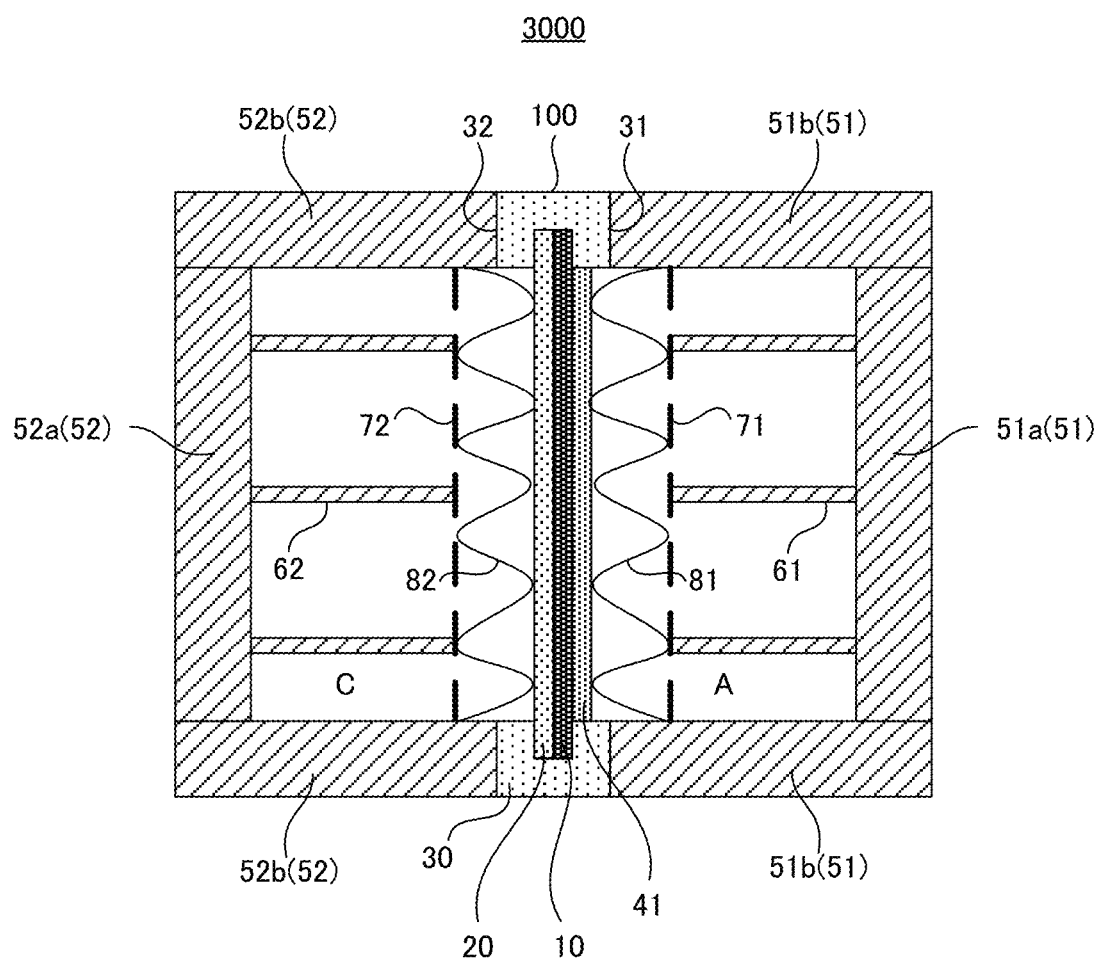
FIG. 7 is a schematically explanatory cross-sectional view of an electrolysis vessel for alkaline water electrolysis 3000 according to another embodiment of the present invention.

In the foregoing description concerning the present invention, the electrolysis vessel for alkaline water electrolysis 1000 of the embodiment of holding the second electrode 41 of a rigid porous plate by the electroconductive rib 61, and the electrolysis vessel for alkaline water electrolysis 2000 of the embodiment of holding the second electrode 21 of a rigid porous plate by the electroconductive rib 62 have been described as an example. The present invention is not limited to these embodiments. For example, an electrolysis vessel for alkaline water electrolysis of the embodiment of pushing the second electrode of a rigid porous plate by an electroconductive second elastic body toward the first electrode may be employed. FIG. 7 is a schematically explanatory cross-sectional view of an electrolysis vessel for alkaline water electrolysis 3000 according to such another embodiment (hereinafter may be referred to as "electrolysis vessel 3000"). In FIG. 7, elements the same as those already shown in FIGS. 2(A) to 2(E), 3(A) to 3(E), 4(A) to 4(E), 5 and 6 are given the same reference signs as in FIGS. 2(A) to 2(E), 3(A) to 3(E), 4(A) to 4(E), 5 and 6, and the description thereof may be omitted. As shown in FIG. 7, the electrolysis vessel 3000 includes the electroconductive anode-side frame 51 defining the anode chamber A; the electroconductive cathode-side frame 52 defining the cathode chamber C; the assembly 100 sandwiched between and held by the anode-side frame 51 and the cathode-side frame 52 so that the anode-side frame 51 is in contact with the first face 31 and the cathode-side frame 52 is in contact with the second face 32; and the anode (second electrode) 41 arranged in contact with the second membrane face 12 of the separating membrane 10, wherein the anode 41 is not held by the gasket 30. In the electrolysis vessel 3000, the assembly 100 is arranged so that the first membrane face 11 of the separating membrane 10 faces the cathode chamber C, and the second membrane face 12 of the separating membrane 10 faces the anode chamber A. In the electrolysis vessel 3000, the cathode (first electrode) 20 is a flexible porous plate (first porous plate), and the anode (second electrode) 41 may be a rigid porous plate, and may be a flexible porous plate (second porous plate). The anode (second electrode) 41 is preferably a rigid porous plate. The electrolysis vessel 3000 includes the electroconductive rib 62 that is provided so as to stick out from the inner wall of the cathode-side frame 52, the current collector 72 that is held by the electroconductive rib 62, and the electroconductive elastic body (first elastic body) 82 that is held by the current collector 72. The cathode 20 is pushed by the elastic body 82 toward the anode 41. The electrolysis vessel 3000 also includes the electroconductive rib 61 that is provided so as to stick out from the inner wall of the anode-side frame 51, the current collector 71 that is held by the electroconductive rib 61, and the electroconductive elastic body (second elastic body) 81 that is held by the current collector 71. The anode 41 is pushed by the elastic body 81 toward the cathode 20.

According to the electrolysis vessel 3000, not only the first elastic body 82 pushes the first electrode 20, which is united with the assembly 100 into one body, toward the anode 41 (toward the separating membrane 10), but also the second elastic body 81 pushes the second electrode 41, which is not united with the assembly 100 into one body, toward the cathode 20 (that is, toward the separating membrane 10). Thus, there is no need to fix not only the first electrode 20, which is united with the assembly 100 into one body, to the frame 52, but also the second electrode 41, which is not united with the assembly 100 into one body, to the frame 51. Therefore, the electrolysis vessel 3000 offers further easy assembly of the electrolysis vessel. The separating membrane 10 receives the pressure from the elastic bodies on both the anode side and the cathode side, which makes it easy to suppress deformation of the separating membrane 10 in the vicinity of the periphery of the second electrode 41. The above described effects concerning the electrolysis vessel 1000 may be also obtained.

Figure 8:
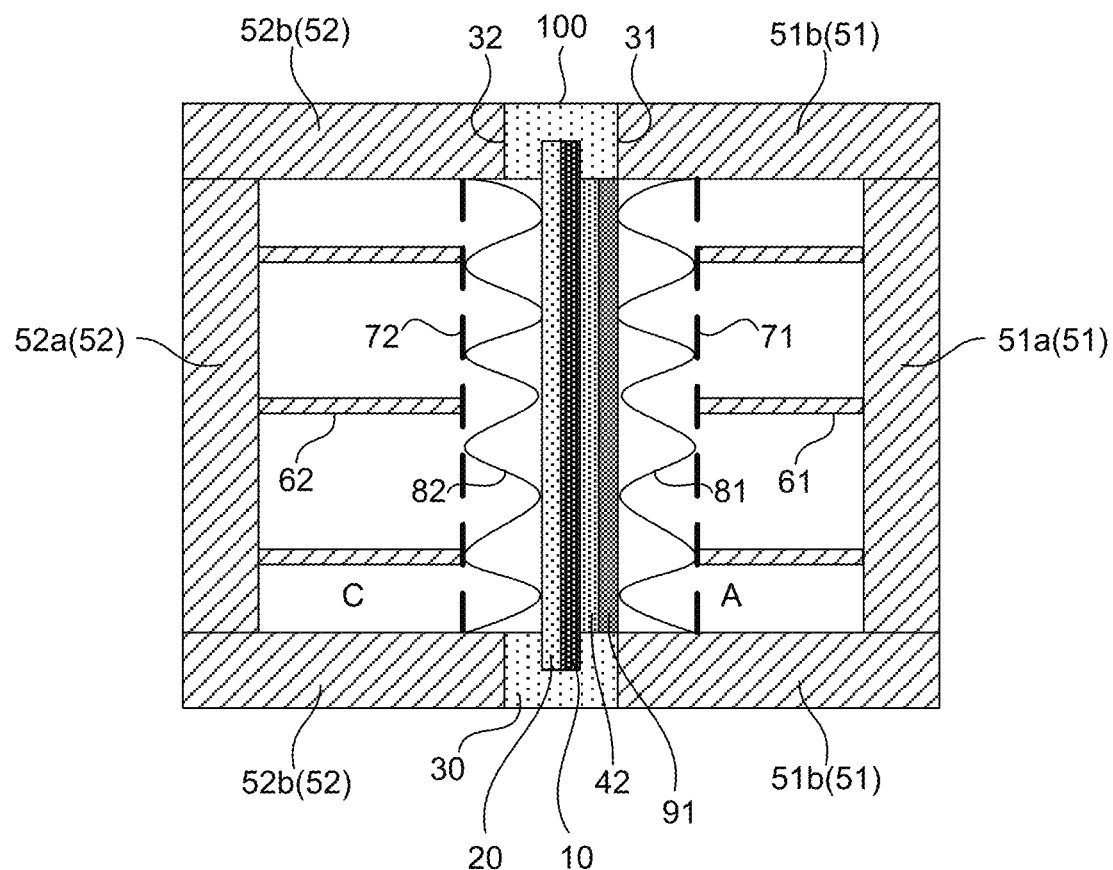
FIG. 8 is a schematically explanatory cross-sectional view of an electrolysis vessel for alkaline water electrolysis 4000 according to another embodiment of the present invention.

In the foregoing description concerning the present invention, the electrolysis vessels for alkaline water electrolysis 1000, 2000 and 3000 of the embodiment of the second electrode of a rigid porous plate, which is not united with the assembly 100 into one body, have been described as an example. The present invention is not limited to this embodiment. For example, an electrolysis vessel for alkaline water electrolysis of the embodiment of a second electrode of a flexible porous plate which is not united with a membrane-electrode-gasket assembly for alkaline water electrolysis as one body may be employed. FIG. 8 is a schematically explanatory cross-sectional view of an electrolysis vessel for alkaline water electrolysis 4000 according to such another embodiment (hereinafter may be referred to as "electrolysis vessel 4000"). In FIG. 8, elements already shown in FIGS. 2(A) to 2(E), 3(A) to 3(E), 4(A) to 4(E), 5, 6 and 7 are given the same reference signs as in FIGS. 2(A) to 2(E), 3(A) to 3(E), 4(A) to 4(E), 5, 6 and 7, and the description thereof may be omitted. As shown in FIG. 8, the electrolysis vessel 4000 includes the electroconductive anode-side frame 51 defining the anode chamber A; the electroconductive cathode-side frame 52 defining the cathode chamber C; the assembly 100 sandwiched between and held by the anode-side frame 51 and the cathode-side frame 52 so that the anode-side frame 51 is in contact with the first face 31 and the cathode-side frame 52 is in contact with the second face 32; and an anode (second electrode) 42 arranged in contact with the second membrane face 12 of the separating membrane 10, wherein the anode 42 is not held by the gasket 30. In the electrolysis vessel 4000, the assembly 100 is arranged so that the first membrane face 11 of the separating membrane 10 faces the cathode chamber C, and the second membrane face 12 of the separating membrane 10 faces the anode chamber A. In the electrolysis vessel 4000, the cathode (first electrode) 20 is a flexible porous plate (first porous plate), and the anode (second electrode) 42 is a flexible porous plate (second porous plate). The electrolysis vessel 4000 includes the electroconductive rib 62 that is provided so as to stick out from the inner wall of the cathode-side frame 52, the current collector 72 that is held by the electroconductive rib 62, and the electroconductive elastic body (first elastic body) 82 that is held by the current collector 72. The cathode 20 is pushed by the elastic body 82 toward the anode 42. The electrolysis vessel 4000 also includes the electroconductive rib 61 that is provided so as to stick out from the inner wall of the anode-side frame 51, the current collector 71 that is held by the electroconductive rib 61, the electroconductive elastic body (second elastic body) 81 that is held by the current collector 71, and an electroconductive rigid current collector 91 that is arranged between the elastic body 81 and the anode 42. The anode 42 is pushed by the elastic body 81 toward the cathode 20 via the rigid current collector 91. That is, in the electrolysis vessel 4000, the rigid current collector 91 is arranged so that the second electrode (anode) 42 is sandwiched between the rigid current collector 91 and the separating membrane 10. The second electrode (anode) 42 is supported by the rigid current collector 91.

As the rigid current collector 91, any known electroconductive rigid current collector may be used. For example, an expanded metal or punching metal made from an alkali-resistant rigid electroconductive material may be preferably employed. Examples of the material of the rigid current collector 91 include simple metals such as nickel and iron; stainless steel such as SUS304, SUS310, SUS310S, SUS316, and SUS316L; and metals obtained by nickeling any of them. The rigid current collector 91 may be, but is not necessarily held by the elastic body 81. When the elastic body 81 holds the rigid current collector 91, any known means such as welding, pinning, and bolting may be employed without particular limitations.

According to the electrolysis vessel 4000, not only the first elastic body 82 pushes the first electrode 20, which is united with the assembly 100 into one body, toward the anode 42 (that is, toward the separating membrane 10), but also the second elastic body 81 pushes the second electrode 42, which is not united with the assembly 100 into one body, toward the cathode 20 (that is, toward the separating membrane 10) via the rigid current collector 91. Thus, there is no need to fix not only the first electrode 20, which is united with the assembly 100 into one body, to the frame 52, but also the second electrode 42, which is not united with the assembly 100 into one body, to the frame 51. Therefore, the electrolysis vessel 4000 offers further easy assembly of the electrolysis vessel. The elastic body 81 pushes the second electrode 42 via the rigid current collector 91 (that is, the second electrode 42 is supported by the rigid current collector 91 from the back), which offers further uniform pressure all over the faces of both electrodes by which both electrodes are pushed toward the separating membrane 10 even when the second electrode, which is not united with the assembly into one body, is flexible, and thus offers further uniform current density. The separating membrane 10 receives the pressure from the elastic bodies on both the anode side and the cathode side, which makes it easy to suppress deformation of the separating membrane 10 in the vicinity of the gasket 30. The above described effects concerning the electrolysis vessel 1000 may be also obtained.

Figure 9:
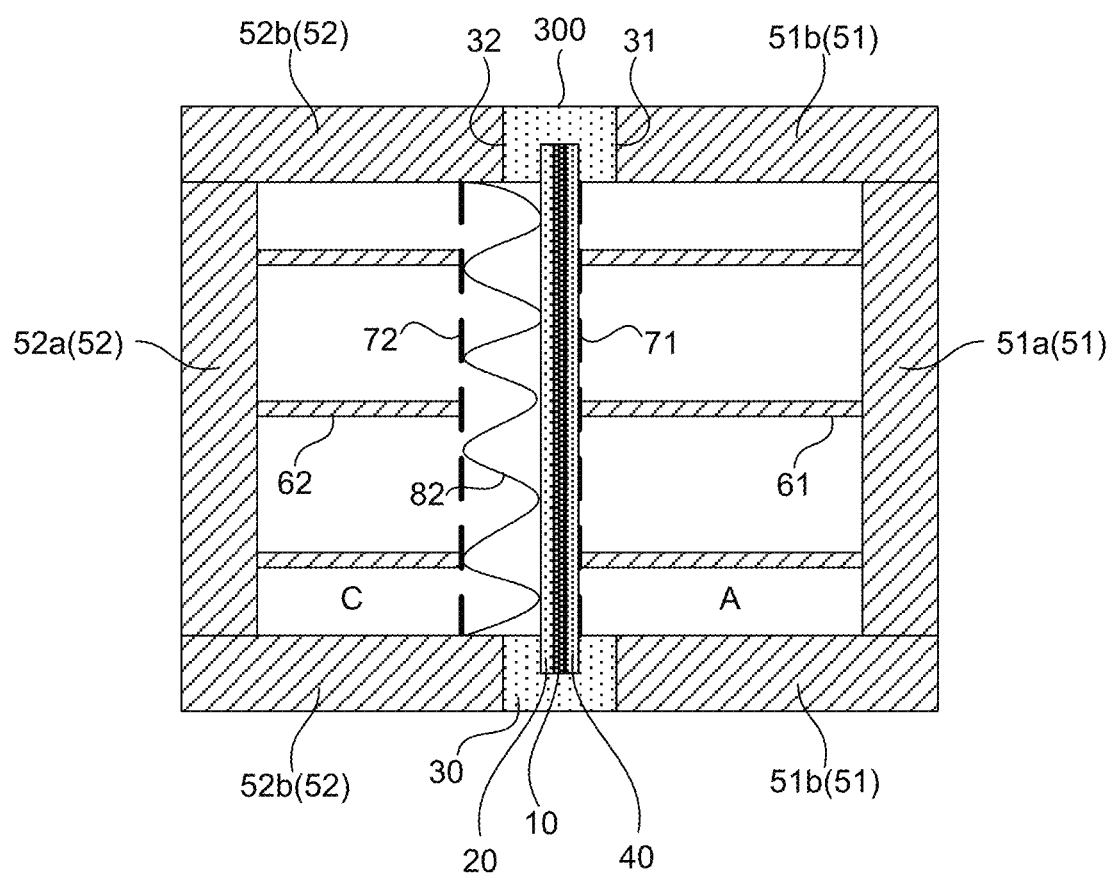
FIG. 9 is a schematically explanatory cross-sectional view of an electrolysis vessel for alkaline water electrolysis 5000 according to another embodiment of the present invention.

In the foregoing description concerning the present invention, the electrolysis vessels for alkaline water electrolysis 1000, 2000, 3000 and 4000 (FIGS. 5 to 8) including the assembly 100 (FIGS. 2(A)-2(E)) of uniting the separating membrane 10 and cathode 20 with the gasket 30 into one body, or the assembly 200 (FIGS. 3(A)-3(E)) of uniting the separating membrane 10 and the anode 40 with the gasket 30 into one body have been described as an example. The present invention is not limited to this embodiment. For example, an electrolysis vessel for alkaline water electrolysis of the embodiment of including the assembly 300 (FIGS. 4(A)-4(E)) of uniting the separating membrane 10, the cathode 20, and the anode 40 with the gasket 30 into one body may be employed. FIG. 9 is a schematically explanatory cross-sectional view of an electrolysis vessel for alkaline water electrolysis 5000 according to such another embodiment (hereinafter may be referred to as "electrolysis vessel 5000"). In FIG. 9, elements already shown in FIGS. 2(A) to 2(E), 3(A) to 3(E), 4(A) to 4(E), 5, 6, 7 and 8 are given the same reference signs as in FIGS. 2(A) to 2(E), 3(A) to 3(E), 4(A) to 4(E), 5, 6, 7 and 8, and the description thereof may be omitted. As shown in FIG. 9, the electrolysis vessel 5000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 5000, the assembly 300 is arranged so that the anode 40 faces the anode chamber A, and the cathode 20 faces the cathode chamber C. In the electrolysis vessel 5000, the cathode (first electrode) 20 is a flexible porous plate (first porous plate). The anode (second electrode) 40 may be a flexible porous plate (second porous plate), and may be a rigid porous plate. The electrolysis vessel 5000 includes the electroconductive rib 62 that is provided so as to stick out from the inner wall of the cathode-side frame 52, the current collector 72 that is held by the electroconductive rib 62, and the electroconductive elastic body (first elastic body) 82 that is held by the current collector 72. The cathode 20 is pushed by the elastic body 82 toward the anode 40. The electrolysis vessel 5000 also includes the electroconductive rib 61 that is provided so as to stick out from the inner wall of the anode-side frame 51, and the current collector 71 that is held by the electroconductive rib 61. The anode 40 is supported by the current collector 71 from the back.

The electrolysis vessel 5000 includes the membrane-electrode-gasket assembly for alkaline water electrolysis 300, which makes it possible for the separating membrane 10 and the cathode 20 to be in direct contact with each other all over the faces thereof (that is, even the periphery), and also makes it possible for the separating membrane 10 and the anode 40 to be in direct contact with each other all over the faces thereof (that is, even the periphery). Thus, the electrolysis vessel 5000 offers reduced operating voltage and energy loss more than conventional zero-gap electrolysis vessels. Since the anode 40 and the cathode 20 are united with the separating membrane 10 and the gasket 30 into one body, there is no need to fix the anode 40 to the anode-side frame 51, and there is no need to fix the cathode 20 to the cathode-side frame 52 either. Therefore, the electrolysis vessel 5000 offers easy assembly of the electrolysis vessel. Further, while the slit part 33 of the gasket 30 receives the periphery of the separating membrane 10, the gasket 30 includes the continuous part 36 sealing the outer peripheral end of the slit part 33 on the outer peripheral side of the slit part 33, which makes it possible for capillary action to prevent an electrolytic solution and gas from leaking from an end part of the separating membrane 10 to the outside of the electrolysis vessel.

In the foregoing description concerning the present invention, the electrolysis vessel for alkaline water electrolysis 5000 of the embodiment of including the current collector 71 supported by the electroconductive rib 61, and supporting the anode 40 by the current collector 71 from the back has been described as an example. The present invention is not limited to this embodiment. For example, an electrolysis vessel for alkaline water electrolysis of the embodiment of not including the current collector 71 when the anode 40 is a rigid porous electrode, and directly supporting the anode 40 by the electroconductive rib 61 from the back may be employed.

Figure 10:
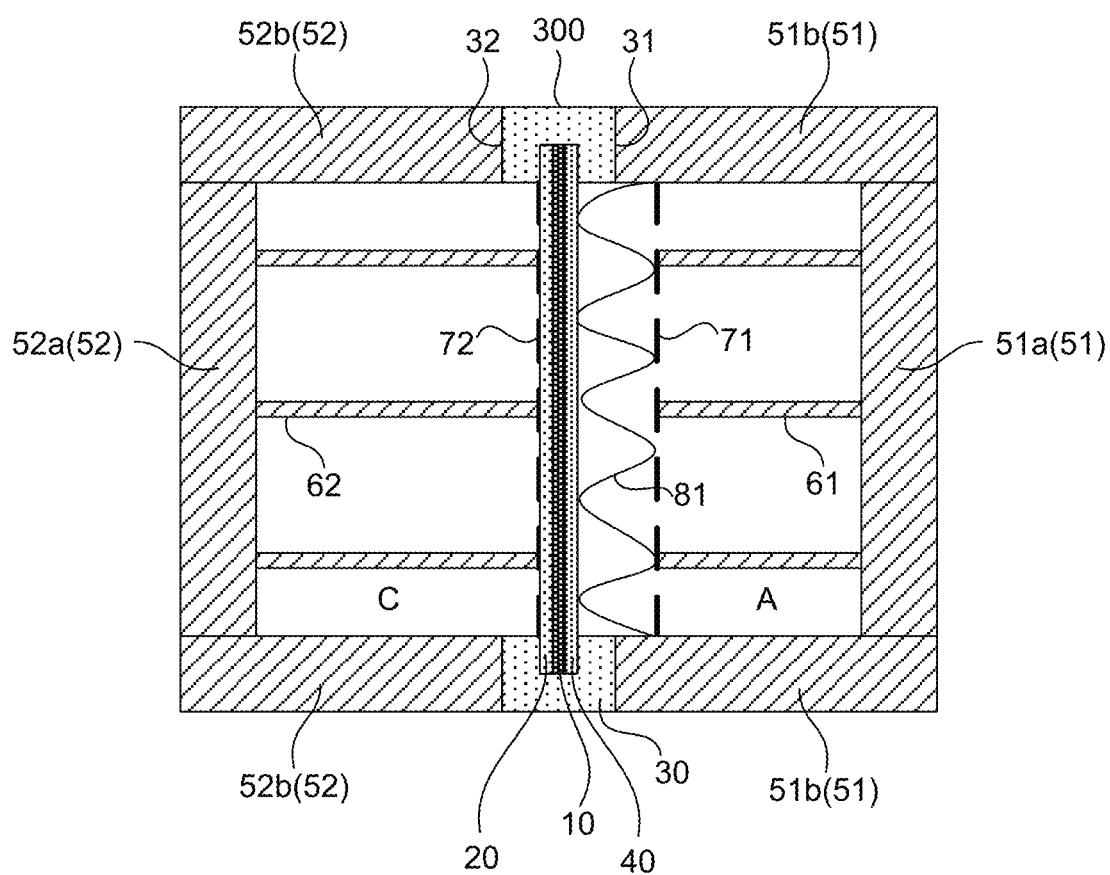
FIG. 10 is a schematically explanatory cross-sectional view of an electrolysis vessel for alkaline water electrolysis 6000 according to another embodiment of the present invention.

In the foregoing description concerning the present invention, the electrolysis vessel for alkaline water electrolysis 5000 of the embodiment of pushing the cathode 20 of a flexible porous plate toward the anode 40 by the elastic body 82, and supporting the anode 40 by the electroconductive rib 61 and the current collector 71 from the back has been described as an example. The present invention is not limited to this embodiment. For example, an electrolysis vessel for alkaline water electrolysis of the embodiment of pushing an anode of a flexible porous plate toward a cathode by an elastic body, and supporting the cathode by an electroconductive rib and a current collector from the back may be employed. FIG. 10 is a schematically explanatory cross-sectional view of an electrolysis vessel for alkaline water electrolysis 6000 according to such another embodiment (hereinafter may be referred to as "electrolysis vessel 6000"). In FIG. 10, elements already shown in FIGS. 2(A) to 2(E), 3(A) to 3(E), 4(A) to 4(E), 5, 6, 7, 8 and 9 are given the same reference signs as in FIGS. 2(A) to 2(E), 3(A) to 3(E), 4(A) to 4(E), 5, 6, 7, 8 and 9, and the description thereof may be omitted. As shown in FIG. 10, the electrolysis vessel 6000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 6000, the assembly 300 is arranged so that the anode 40 faces the anode chamber A, and the cathode 20 faces the cathode chamber C. In the electrolysis vessel 6000, the anode (first electrode) 40 is a flexible porous plate (first porous plate). The cathode (second electrode) 20 may be a flexible porous plate (second porous plate), and may be a rigid porous plate. The electrolysis vessel 6000 includes the electroconductive rib 61 that is provided so as to stick out from the inner wall of the anode-side frame 51, the current collector 71 that is held by the electroconductive rib 61, and the electroconductive elastic body (first elastic body) 81 that is held by the current collector 71. The anode 40 is pushed by the elastic body 81 toward the cathode 20. The electrolysis vessel 6000 also includes the electroconductive rib 62 that is provided so as to stick out from the inner wall of the cathode-side frame 52, and the current collector 72 that is held by the electroconductive rib 62. The cathode 20 is supported by the current collector 72 from the back. The same effects as the above described electrolysis vessel 5000 may be obtained from the electrolysis vessel for alkaline water electrolysis 6000 of such an embodiment.

In the foregoing description concerning the present invention, the electrolysis vessel for alkaline water electrolysis 6000 of the embodiment of including the current collector 72 supported by the electroconductive rib 62, and supporting the cathode 20 by the current collector 72 from the back has been described as an example. The present invention is not limited to this embodiment. For example, an embodiment of an electrolysis vessel for alkaline water electrolysis is not necessarily comprise the current collector 72 when the cathode 20 is a rigid porous electrode, and directly supporting the cathode 20 by the electroconductive rib 62 from the back.

Figure 11:
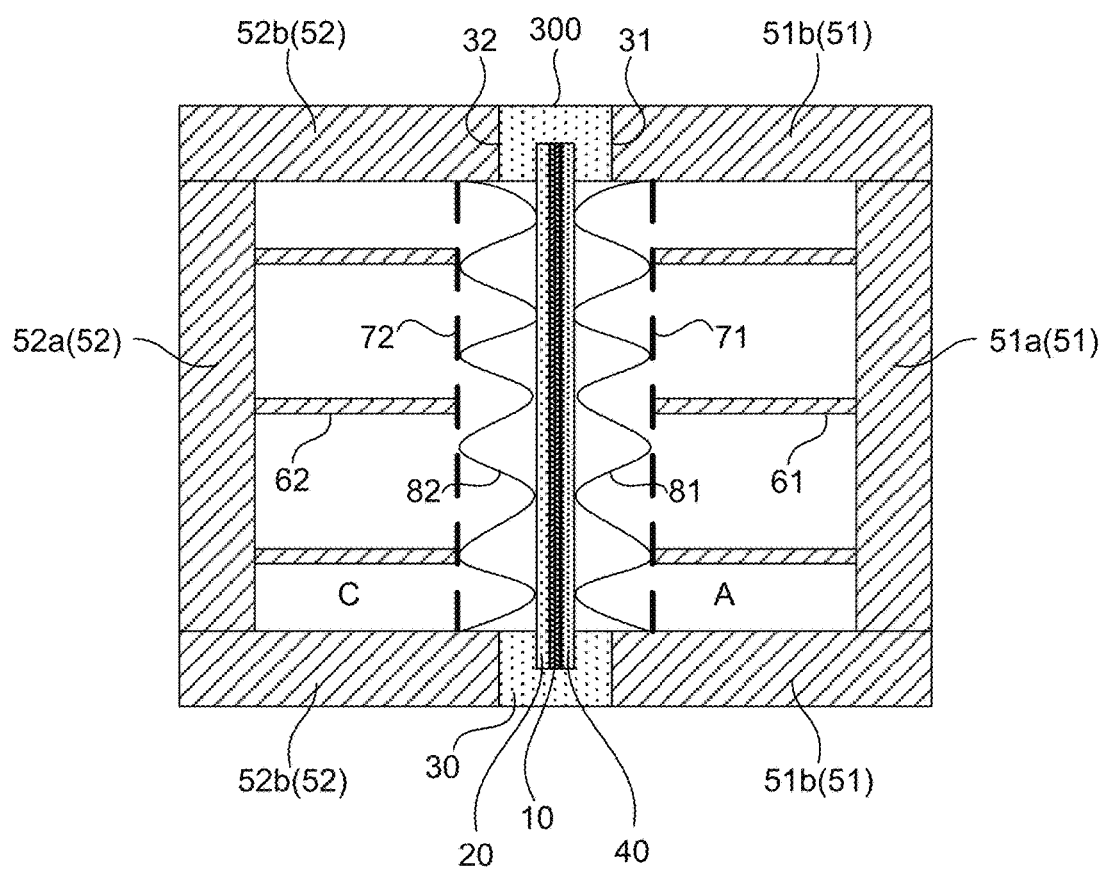
FIG. 11 is a schematically explanatory cross-sectional view of an electrolysis vessel for alkaline water electrolysis 7000 according to another embodiment of the present invention.

In the foregoing description concerning the present invention, the electrolysis vessels for alkaline water electrolysis 5000 and 6000 of the embodiment of pushing the first electrode of a flexible porous plate toward the second electrode by the electroconductive first elastic body, and supporting the second electrode by the electroconductive rib from the back have been described as an example. The present invention is not limited to this embodiment. For example, an electrolysis vessel for alkaline water electrolysis of the embodiment of pushing the first electrode of a flexible porous plate toward the second electrode by the electroconductive first elastic body, and pushing the second electrode toward the first electrode by the electroconductive second elastic body may be employed. FIG. 11 is a schematically explanatory cross-sectional view of an electrolysis vessel for alkaline water electrolysis 7000 according to such another embodiment (hereinafter may be referred to as "electrolysis vessel 7000"). In FIG. 11, elements already shown in FIGS. 2(A) to 2(E), 3(A) to 3(E), 4(A) to 4(E), 5, 6, 7, 8, 9 and 10 are given the same reference signs as in FIGS. 2(A) to 2(E), 3(A) to 3(E), 4(A) to 4(E), 5, 6, 7, 8, 9 and 10, and the description thereof may be omitted. As shown in FIG. 11, the electrolysis vessel 7000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 7000, the assembly 300 is arranged so that the anode 40 faces the anode chamber A, and the cathode 20 faces the cathode chamber C. In the electrolysis vessel 7000, at least one of the cathode (first electrode) 20 and the anode (second electrode) 40 is a flexible porous plate. Both the cathode (first electrode) 20 and the anode (second electrode) 40 may be flexible porous plates. Preferably, one of the cathode (first electrode) 20 and the anode (second electrode) 40 is a flexible porous plate, and the other thereof is a rigid porous plate. The electrolysis vessel 7000 includes the electroconductive rib 62 that is provided so as to stick out from the inner wall of the cathode-side frame 52, the current collector 72 that is held by the electroconductive rib 62, and the electroconductive elastic body (first elastic body) 82 that is held by the current collector 72. The cathode 20 is pushed by the elastic body 82 toward the anode 40. The electrolysis vessel 7000 also includes the electroconductive rib 61 that is provided so as to stick out from the inner wall of the anode-side frame 51, the current collector 71 that is held by the electroconductive rib 61, and the electroconductive elastic body (second elastic body) 81 that is held by the current collector 71. The anode 40 is pushed by the elastic body 81 toward the cathode 20.

The same effects as the above described electrolysis vessel 5000 may be obtained from the electrolysis vessel for alkaline water electrolysis 7000 of such an embodiment. The separating membrane 10 receives the pressure from the elastic bodies on both the anode side and the cathode side, which makes it easy to suppress deformation of the separating membrane 10 in the vicinity of the gasket 30.

Figure 12:
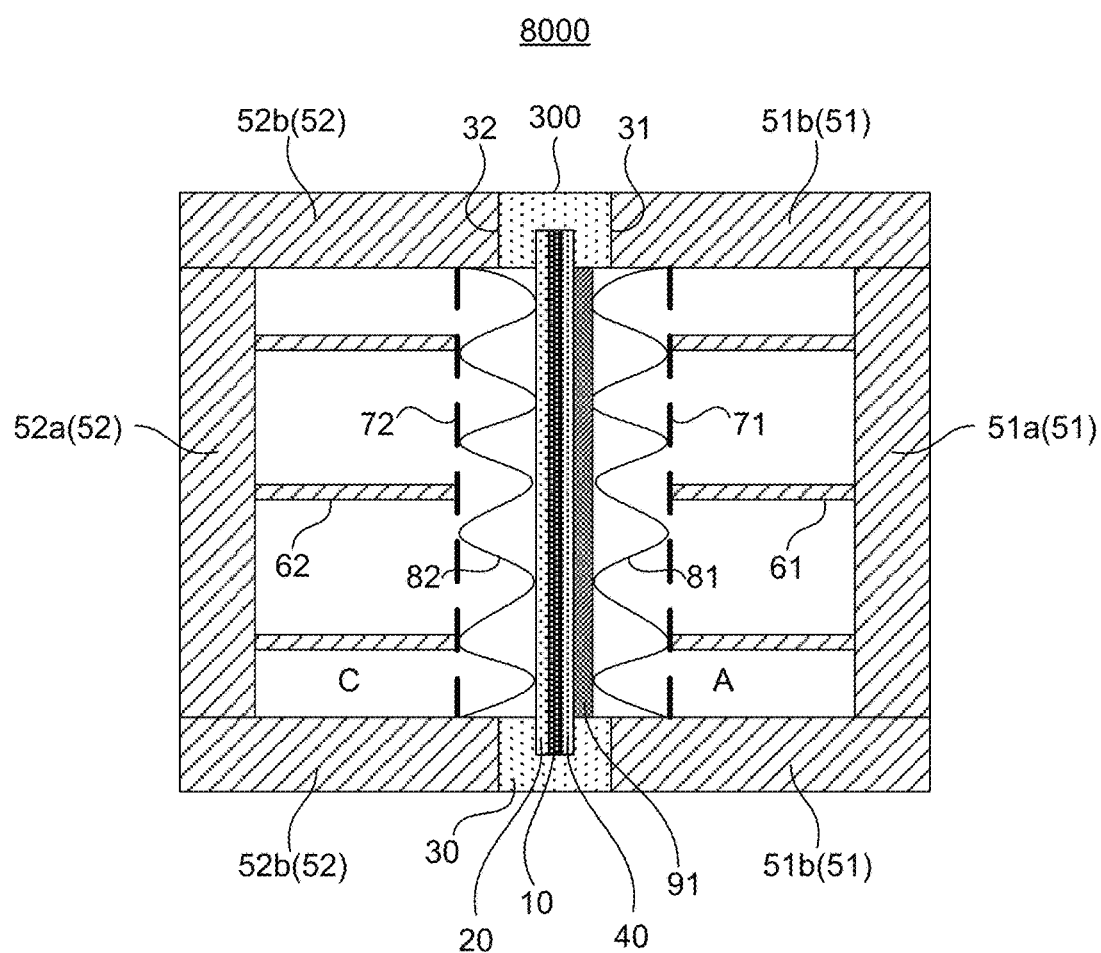
FIG. 12 is a schematically explanatory cross-sectional view of an electrolysis vessel for alkaline water electrolysis 8000 according to another embodiment of the present invention.

FIG. 12 is a schematically explanatory cross-sectional view of an electrolysis vessel for alkaline water electrolysis 8000 (hereinafter may be referred to as "electrolysis vessel 8000") according to still another embodiment. In FIG. 12, elements already shown in FIGS. 2(A) to 2(E), 3(A) to 3(E), 4(A) to 4(E), 5, 6, 7, 8, 9, 10 and 11 are given the same reference signs as in FIGS. 2(A) to 2(E), 3(A) to 3(E), 4(A) to 4(E), 5, 6, 7, 8, 9, 10 and 11, and the description thereof may be omitted. As shown in FIG. 12, the electrolysis vessel 8000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 8000, the assembly 300 is arranged so that the anode 40 faces the anode chamber A, and the cathode 20 faces the cathode chamber C. In the electrolysis vessel 8000, the cathode (first electrode) 20 is a flexible porous plate (first porous plate). The anode (second electrode) 40 may be a rigid porous plate, and may be a flexible porous plate (second porous plate). The anode (second electrode) 40 is preferably a flexible porous plate. The electrolysis vessel 8000 includes the electroconductive rib 62 that is provided so as to stick out from the inner wall of the cathode-side frame 52, the current collector 72 that is held by the electroconductive rib 62, and the electroconductive elastic body (first elastic body) 82 that is held by the current collector 72. The cathode 20 is pushed by the elastic body 82 toward the anode 40. The electrolysis vessel 8000 also includes the electroconductive rib 61 that is provided so as to stick out from the inner wall of the anode-side frame 51, the current collector 71 that is held by the electroconductive rib 61, the electroconductive elastic body (second elastic body) 81 that is held by the current collector 71, and the electroconductive rigid current collector 91 that is arranged between the elastic body 81 and the anode 40. The anode 40 is pushed by the elastic body 81 toward the cathode 20 via the rigid current collector 91. That is, in the electrolysis vessel 8000, the rigid current collector 91 is arranged so that the second electrode (anode) 40 is sandwiched between the rigid current collector 91 and the separating membrane 10. The second electrode (anode) 40 is supported by the rigid current collector 91.

According to the electrolysis vessel 8000, the elastic body 81 pushes the anode 40 via the rigid current collector 91 (that is, the anode 40 is supported by the rigid current collector 91 from the back), which offers further uniform pressure all over the faces of both electrodes by which both electrodes are pushed toward the separating membrane 10 even when both the anode 40 and the cathode 20 are flexible, and thus offers further uniform current density. The above described effects concerning the electrolysis vessel 7000 may be also obtained.

Figure 13:
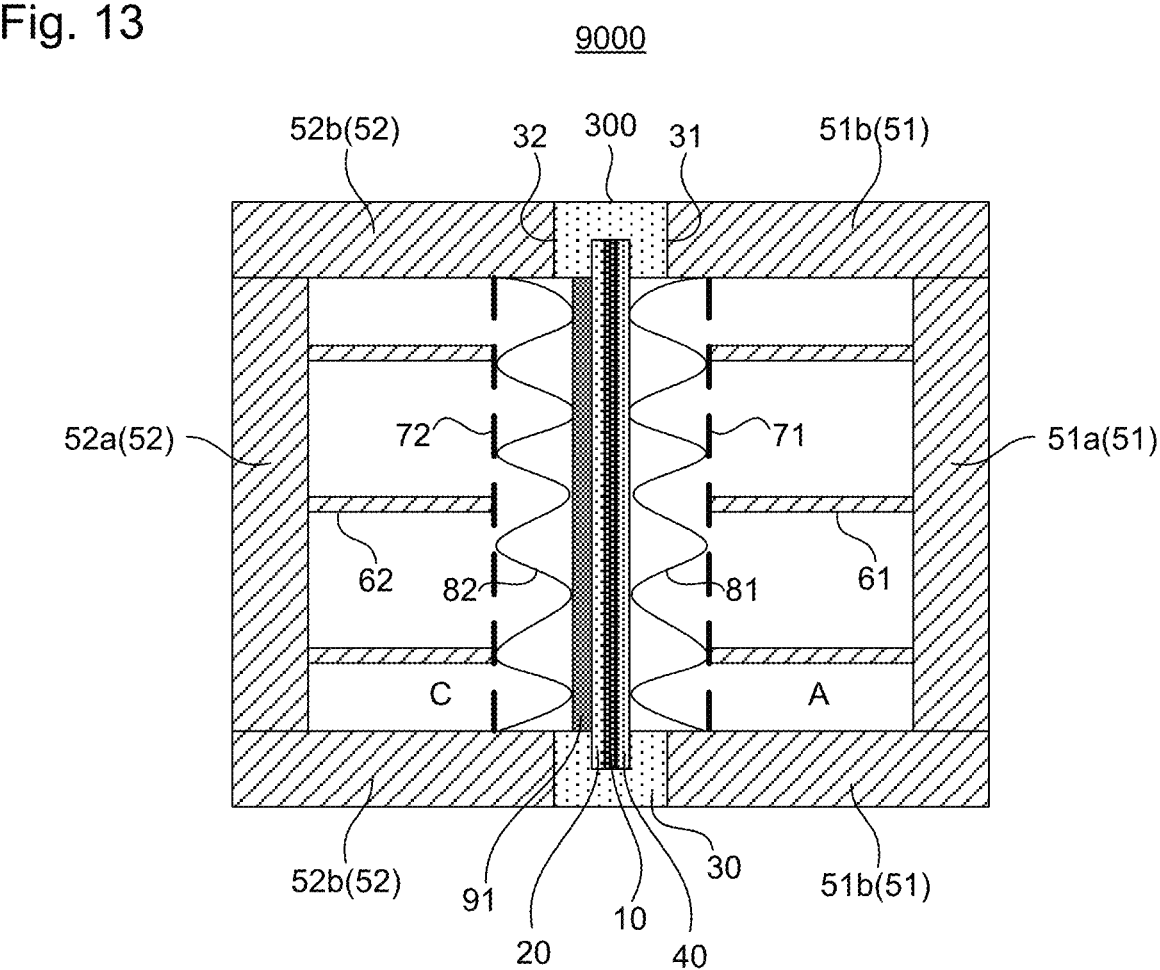
FIG. 13 is a schematically explanatory cross-sectional view of an electrolysis vessel for alkaline water electrolysis 9000 according to another embodiment of the present invention.

In the foregoing description concerning the present invention, the electrolysis vessel for alkaline water electrolysis 8000 of the embodiment of pushing the anode 40 toward the cathode 20 by the electroconductive elastic body 81 via the rigid current collector 91 has been described as an example. The present invention is not limited to this embodiment. For example, an electrolysis vessel for alkaline water electrolysis of the embodiment of pushing a cathode toward an anode by an electroconductive elastic body via a rigid current collector may be employed. FIG. 13 is a schematically explanatory cross-sectional view of an electrolysis vessel for alkaline water electrolysis 9000 (hereinafter may be referred to as "electrolysis vessel 9000") according to such another embodiment. In FIG. 13, elements already shown in FIGS. 2(A) to 2(E), 3(A) to 3(E), 4(A) to 4(E), 5, 6, 7, 8, 9, 10, 11 and 12 are given the same reference signs as in FIGS. 2(A) to 2(E), 3(A) to 3(E), 4(A) to 4(E), 5, 6, 7, 8, 9, 10, 11 and 12, and the description thereof may be omitted. As shown in FIG. 13, the electrolysis vessel 9000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 9000, the assembly 300 is arranged so that the anode 40 faces the anode chamber A, and the cathode 20 faces the cathode chamber C. In the electrolysis vessel 9000, the anode (first electrode) 40 is a flexible porous plate (first porous plate). The cathode (second electrode) 20 may be a rigid porous plate, and may be a flexible porous plate (second porous plate). The cathode (second electrode) 20 is preferably a flexible porous plate. The electrolysis vessel 9000 includes the electroconductive rib 61 that is provided so as to stick out from the inner wall of the anode-side frame 51, the current collector 71 that is held by the electroconductive rib 61, and the electroconductive elastic body (first elastic body) 81 that is held by the current collector 71. The anode 40 is pushed by the elastic body 81 toward the cathode 20. The electrolysis vessel 9000 also includes the electroconductive rib 62 that is provided so as to stick out from the inner wall of the cathode-side frame 52, the current collector 72 that is held by the electroconductive rib 62, the electroconductive elastic body (second elastic body) 82 that is held by the current collector 72, and the electroconductive rigid current collector 91 that is arranged between the elastic body 82 and the cathode 20. The cathode 20 is pushed by the elastic body 82 toward the anode 40 via the rigid current collector 91. That is, in the electrolysis vessel 9000, the rigid current collector 91 is arranged so that the second electrode (cathode) 20 is sandwiched between the rigid current collector 91 and the separating membrane 10. The second electrode (cathode) 20 is supported by the rigid current collector 91.

The same effects as the above described electrolysis vessel 8000 may be also obtained from the electrolysis vessel for alkaline water electrolysis 9000 of such an embodiment. That is, according to the electrolysis vessel 9000, the elastic body 82 pushes the cathode 20 via the rigid current collector 91 (that is, the cathode 20 is supported by the rigid current collector 91 from the back), which offers further uniform pressure all over the faces of both electrodes by which both electrodes are pushed toward the separating membrane 10 even when both the anode 40 and the cathode 20 are flexible, and thus offers further uniform current density. The above described effects concerning the electrolysis vessel 7000 may be also obtained.

Figure 14:
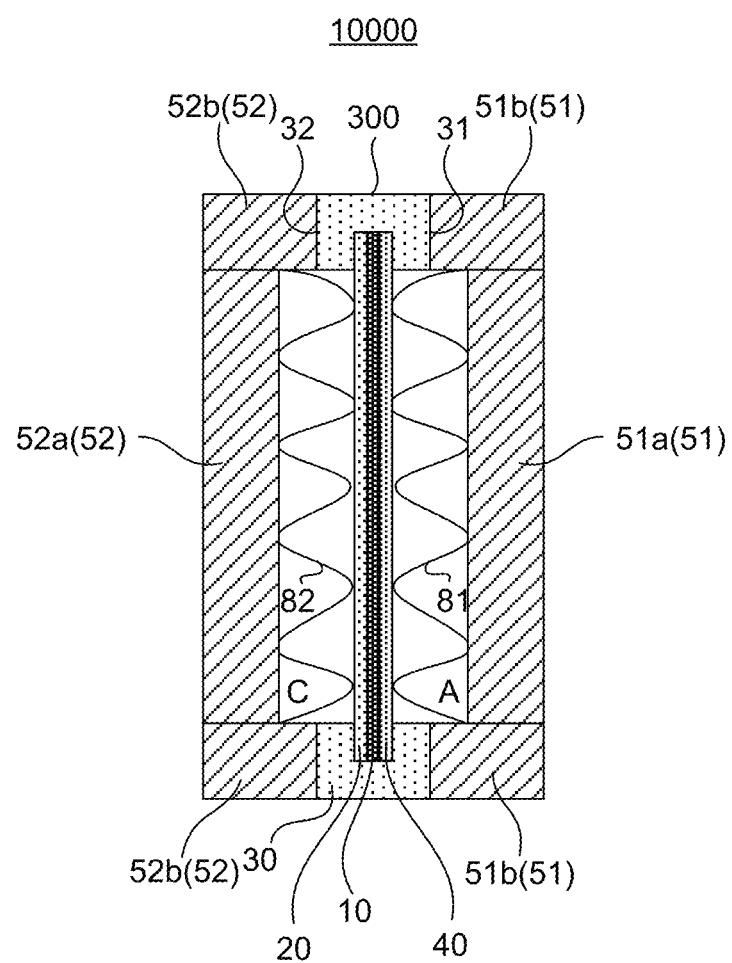
FIG. 14 is a schematically explanatory cross-sectional view of an electrolysis vessel for alkaline water electrolysis 10000 according to another embodiment of the present invention.

In the foregoing description concerning the present invention, the electrolysis vessels for alkaline water electrolysis 1000 to 9000 of the embodiment of including the electroconductive rib 61 in the anode chamber, and including the electroconductive rib 62 in the cathode chamber have been described as an example. The present invention is not limited to this embodiment. For example, an embodiment of an electrolysis vessel for alkaline water electrolysis of the embodiment is not necessarily comprise an electroconductive rib in one or both of an anode chamber and a cathode chamber. FIG. 14 is a schematically explanatory cross-sectional view of an electrolysis vessel for alkaline water electrolysis 10000 (hereinafter may be referred to as "electrolysis vessel 10000") according to such another embodiment. In FIG. 14, elements already shown in FIGS. 2(A) to 2(E), 3(A) to 3(E), 4(A) to 4(E), 5, 6, 7, 8, 9, 10, 11, 12 and 13 are given the same reference signs as in FIGS. 2(A) to 2(E), 3(A) to 3(E), 4(A) to 4(E), 5, 6, 7, 8, 9, 10, 11, 12 and 13, and the description thereof may be omitted. As shown in FIG. 14, the electrolysis vessel 10000 includes the electroconductive anode-side frame 51 defining the anode chamber A; the electroconductive cathode-side frame 52 defining the cathode chamber C; and the assembly 300 sandwiched between and held by the anode-side frame 51 and the cathode-side frame 52 so that the anode-side frame 51 is in contact with the first face 31 and the cathode-side frame 52 is in contact with the second face 32. In the electrolysis vessel 10000, the assembly 300 is arranged so that the anode 40 faces the anode chamber A, and the cathode 20 faces the cathode chamber C. In the electrolysis vessel 10000, at least one of the cathode (first electrode) 20 and the anode (second electrode) 40 is a flexible porous plate. Both the cathode (first electrode) 20 and the anode (second electrode) 40 may be flexible porous plates. Preferably, one of the cathode (first electrode) 20 and the anode (second electrode) 40 is a flexible porous plate, and the other thereof is a rigid porous plate. The electrolysis vessel 10000 includes the electroconductive elastic body (first elastic body) 82 that is arranged between the electroconductive backside separating wall 52a of the cathode-side frame 52 and the cathode 20 so as to be in direct contact with the backside separating wall 52a and the cathode 20. The cathode 20 is pushed by the elastic body 82 toward the anode 40. The electrolysis vessel 10000 also includes the electroconductive elastic body (second elastic body) 81 that is arranged between the electroconductive backside separating wall 51a of the anode-side frame 51 and the anode 40 so as to be in direct contact with the backside separating wall 51a and the anode 40. The anode 40 is pushed by the elastic body 81 toward the cathode 20.

The effects same as the above described electrolysis vessel 7000 may be also obtained from the electrolysis vessel for alkaline water electrolysis 10000 of such an embodiment. Further, in the electrolysis vessel 10000, the anode chamber A and the cathode chamber C do not include any electroconductive rib, which makes it possible to thinner each electrolytic cell, which offers a downsized electrolysis vessel, which offers increased gas production per occupied site area. One or both of the anode chamber and the cathode chamber include(s) no electroconductive rib, which makes it possible to reduce materials to constitute the electrolysis vessel, and steps necessary for making the electrolysis vessel.

EXAMPLES

Hereinafter the present invention will be described in more detail based on example and comparative example. The present invention is not limited to these examples.

Examples

Alkaline water was electrolyzed under the conditions of: current-carrying cross section 0.5 dm$^2$, electrode solution temperature 80° C., KOH concentration 25 mass %, and current density 60 A/dm$^2$, using the electrolysis vessel for alkaline water electrolysis 5000 (FIG. 9) including the membrane-electrode-gasket assembly for alkaline water electrolysis 300 (FIGS. 3(A)-3(E)), which is encompassed in the present invention, to measure a necessary voltage.

Comparative Example

Alkaline water was electrolyzed under the same conditions as in the example except that a zero-gap electrolysis vessel having a conventional structure of not uniting a gasket and electrodes into one body (see FIG. 1) was used instead of the electrolysis vessel for alkaline water electrolysis used in example, to measure a necessary voltage.
<Evaluation Result>

The electrolysis vessel for alkaline water electrolysis used in example made it possible to reduce a voltage necessary for electrolysis by 1.5% compared to the conventional zero-gap electrolysis vessel used in comparative example although their electric conduction area and current value were the same. This shows that an increased area where zero-gap was achieved (the electrodes and the separating membrane were in direct contact with each other) led to a further uniform current flow all over the conducting surface. While crystal deposition due to leakage of the electrode solution was confirmed around the gasket of the electrolysis vessel of comparative example one day after the start of the electrolysis, no crystal deposition due to leakage of the electrode solution was confirmed in the electrolysis vessel for alkaline water electrolysis used in example even after the electrolysis had continued for 2 weeks.

REFERENCE SIGNE LIST 10 (ionic-permeable) separating membrane
11 first membrane face
12 second membrane face
20, 21 cathode
30 gasket
31 first face
32 second face
33 slit part
34 first part
35 second part
36 continuous part
40, 41, 42 anode
100, 200, 300 membrane-electrode-gasket assembly for alkaline water electrolysis
51 anode-side frame
52 cathode-side frame
51a, 52a (conductive) backside separating wall
51b, 52b flange part
61, 62 electroconductive rib
71, 72 current collector
81, 82 electroconductive elastic body
91 rigid current collector
900 conventional zero-gap electrolysis vessel
910 electrode chamber unit
911 electroconductive separating wall
912 flange part
913, 914 electroconductive rib
920 ionic-permeable separating membrane
930 gasket
940 anode
950 current collector
960 electroconductive elastic body
970 cathode
1000, 2000, 3000, 4000, 5000, 6000, 7000, 8000, 9000, 10000 electrolysis vessel for
alkaline water electrolysis
A anode chamber
C cathode chamber

We claim:
1. An electrolysis vessel for alkaline water electrolysis, the electrolysis vessel comprising:
an anode-side frame defining an anode chamber;
a cathode-side frame defining a cathode chamber;
a membrane-electrode-gasket assembly comprising an insulating gasket, wherein the anode-side frame and the cathode-side frame sandwich the assembly, to hold the assembly;
a second electrode arranged in contact with the second membrane face of the separating membrane, wherein the second electrode is not held by the gasket,
the assembly comprising:
a separating membrane having a first membrane face and a second membrane face;
a first electrode arranged in contact with the first membrane face; and
the gasket holding the separating membrane and the first electrode as one body, wherein the gasket is formed of an alkali-resistant elastomer;
the gasket comprising:
a first face for contacting with the anode-side frame;
a second face for contacting with the cathode-side frame;
a slit part opening toward an inner peripheral side of the gasket and receiving an entire periphery of the separating membrane and an entire periphery of the first electrode;
a first part and a second part, the first part and the second part facing each other across the slit part in a direction crossing the first face and the second face, the first part having the first face and the second part having the second face; and a continuous part arranged on an outer peripheral side of the slit part, the continuous part uniting the first part and the second part into one body and sealing an outer peripheral end of the slit part, wherein the first part and the second part sandwich the entire periphery of the separating membrane and the entire periphery of the first electrode, to hold the entire periphery of the separating membrane and the entire periphery of the first electrode as one body;

the assembly is arranged such that the first membrane face of the separating membrane faces the anode chamber and the second membrane face of the separating membrane faces the cathode chamber;

the first electrode is an anode; and the second electrode is a cathode.

2. An electrolysis vessel for alkaline water electrolysis, the electrolysis vessel comprising:

an anode-side frame defining an anode chamber;

a cathode-side frame defining a cathode chamber;

a membrane-electrode-gasket assembly comprising an insulating gasket, wherein the anode-side frame and the cathode-side frame sandwich the assembly, to hold the assembly;

a second electrode arranged in contact with the second membrane face of the separating membrane, wherein the second electrode is not held by the gasket, the assembly comprising:

a separating membrane having a first membrane face and a second membrane face;

a first electrode arranged in contact with the first membrane face; and the gasket holding the separating membrane and the first electrode as one body, wherein the gasket is formed of an alkali-resistant elastomer;

the gasket comprising:

a first face for contacting with the anode-side frame;

a second face for contacting with the cathode-side frame;

a slit part opening toward an inner peripheral side of the gasket and receiving an entire periphery of the separating membrane and an entire periphery of the first electrode;

a first part and a second part, the first part and the second part facing each other across the slit part in a direction crossing the first face and the second face, the first part having the first face and the second part having the second face; and a continuous part arranged on an outer peripheral side of the slit part, the continuous part uniting the first part and the second part into one body and sealing an outer peripheral end of the slit part, wherein the first part and the second part sandwich the entire periphery of the separating membrane and the entire periphery of the first electrode, to hold the entire periphery of the separating membrane and the entire periphery of the first electrode as one body;

the assembly is arranged such that the first membrane face of the separating membrane faces the cathode chamber and the second membrane face of the separating membrane faces the anode chamber;

the first electrode is a cathode; and the second electrode is an anode.

3. The electrolysis vessel according to claim 1, further comprising:

an electroconductive first elastic body pushing the first electrode toward the second electrode, wherein the first electrode is a flexible first porous plate.

4. The electrolysis vessel according to claim 3, wherein the second electrode is a rigid porous plate.

5. The electrolysis vessel according to claim 4, further comprising:

an electroconductive second elastic body pushing the second electrode toward the first electrode.

6. The electrolysis vessel according to claim 3, further comprising:

an electroconductive second elastic body pushing the second electrode toward the first electrode, wherein the second electrode is a flexible second porous plate.

7. The electrolysis vessel according to claim 3, further comprising:

an electroconductive rigid current collector arranged in contact with the second electrode, wherein the rigid current collector is arranged such that the rigid current collector and the separating membrane sandwich the second electrode;

the second electrode is a flexible second porous plate; and the second electrode is supported by the rigid current collector.

8. The electrolysis vessel according to claim 2, further comprising:

an electroconductive first elastic body pushing the first electrode toward the second electrode, wherein the first electrode is a flexible first porous plate.

9. The electrolysis vessel according to claim 8, wherein the second electrode is a rigid porous plate.

10. The electrolysis vessel according to claim 9, further comprising:

an electroconductive second elastic body pushing the second electrode toward the first electrode.

11. The electrolysis vessel according to claim 8, further comprising:

an electroconductive second elastic body pushing the second electrode toward the first electrode, wherein the second electrode is a flexible second porous plate.

12. The electrolysis vessel according to claim 8, further comprising:

an electroconductive rigid current collector arranged in contact with the second electrode, wherein the rigid current collector is arranged such that the rigid current collector and the separating membrane sandwich the second electrode;

the second electrode is a flexible second porous plate; and the second electrode is supported by the rigid current collector.

* * * * *